(12) United States Patent
Ohta et al.

(10) Patent No.: US 7,961,278 B2
(45) Date of Patent: Jun. 14, 2011

(54) OPTICAL SHEET STACK AND LIQUID CRYSTAL DISPLAY DEVICE

(75) Inventors: Eiji Ohta, Miyagi (JP); Toru Abiko, Miyagi (JP); Yasuyuki Kudo, Miyagi (JP); Shogo Shinkai, Miyagi (JP); Shigehiro Yamakita, Miyagi (JP); Makoto Aoki, Miyagi (JP)

(73) Assignee: Sony Corporation, Tokyo (JP)

(*) Notice: Subject to any disclaimer, the term of this patent is extended or adjusted under 35 U.S.C. 154(b) by 490 days.

(21) Appl. No.: 11/936,599

(22) Filed: Nov. 7, 2007

(65) Prior Publication Data

US 2008/0259243 A1  Oct. 23, 2008

(30) Foreign Application Priority Data

Nov. 9, 2006 (JP) ................... 2006-304158

(51) Int. Cl.
*G02F 1/1335* (2006.01)
(52) U.S. Cl. .................. 349/113; 349/64
(58) Field of Classification Search .................. None
See application file for complete search history.

(56) References Cited

U.S. PATENT DOCUMENTS

| | | | | |
|---|---|---|---|---|
| 5,587,816 A | * | 12/1996 | Gunjima et al. | 349/62 |
| 6,590,625 B1 | * | 7/2003 | Umemoto et al. | 349/65 |
| 6,742,921 B2 | * | 6/2004 | Umemoto et al. | 362/561 |
| 7,072,096 B2 | * | 7/2006 | Holman et al. | 359/298 |
| 7,545,460 B2 | * | 6/2009 | Arima et al. | 349/64 |
| 2002/0057413 A1 | * | 5/2002 | Sumida et al. | 349/187 |
| 2007/0242184 A1 | * | 10/2007 | Ohta et al. | 349/64 |
| 2008/0316392 A1 | * | 12/2008 | Arima et al. | 349/64 |
| 2009/0213464 A1 | * | 8/2009 | Kurachi et al. | 359/599 |
| 2009/0257001 A1 | * | 10/2009 | Sumida et al. | 349/65 |

FOREIGN PATENT DOCUMENTS

| | | |
|---|---|---|
| JP | 6-102506 | 4/1994 |
| JP | 9-146093 | 6/1997 |
| JP | 2007-46216 | 2/2004 |
| JP | 2007-11292 | 1/2007 |
| WO | WO9406051 | 3/1994 |

* cited by examiner

*Primary Examiner* — Mark A Robinson
*Assistant Examiner* — Mary A El-Shammaa
(74) *Attorney, Agent, or Firm* — K&L Gates LLP

(57) ABSTRACT

There is provided an optical sheet stack which includes a first optical sheet having a large number of irregularities consecutively arranged on one surface thereof, and a second optical sheet stacked thereon. In the optical sheet stack, the second optical sheet has, on a bonding surface thereof, an adhesive layer bonded with apexes of the irregularities, and while assuming pitch of arrangement of the irregularities as P, and width of bonding of each apex of the irregularities bonded to the adhesive layer as Pw, the relation of $0<Pw/P\leq 0.2$ is satisfied.

12 Claims, 13 Drawing Sheets

FIG.9

| SAMPLE | HAZE (%) | δa (rad) | RELATIVE VALUE OF FRONT LUMINANCE (%) |
|---|---|---|---|
| S1 | 1 | 0.0023 | 100 |
| S2 | 85.5 | 0.4352 | 68 |
| S3 | 14.9 | 0.0442 | 93 |
| S4 | 13.7 | 0.0733 | 97 |
| S5 | 93.2 | 0.4880 | 65 |
| S6 | 11 | 0.0522 | 97 |
| S7 | 80.7 | 0.3701 | 76 |
| S8 | 35.1 | 0.1067 | 94 |
| S9 | 5.8 | 0.0245 | 99 |
| S10 | 33.6 | 0.1023 | 97 |
| S11 | 22.3 | 0.0738 | 86 |

OPTICAL SHEET STACK AND LIQUID CRYSTAL DISPLAY DEVICE

CROSS REFERENCES TO RELATED APPLICATIONS

The present application claims priority to Japanese Patent Application JP 2006-304158 filed in the Japanese Patent Office on Nov. 9, 2006, the entire contents of which is being incorporated herein by reference.

BACKGROUND

The present application relates to an optical sheet stack and a liquid crystal display device, aimed at preventing deflection of sheet, reducing the number of side-components, and preventing thermal deformation, while minimizing lowering in front luminance.

Liquid crystal display devices (LCD), characterized by their possibilities of reducing power consumption and thinning as compared with those of cathode ray tubes (CRT), have a wide variation in size, and are currently adopted to small instruments such as mobile phones and digital cameras, up to large instruments such as liquid crystal television set.

The liquid crystal display devices are classified into those of transmission type, reflection type and so forth. The transmission-type liquid crystal display device has a liquid crystal display panel composed of a liquid crystal layer and a pair of transparent substrates holding it in between, and a backlight unit as an illumination light source. The backlight unit is classified into those of direct type having the light source directly under or adjacent to the liquid crystal display panel, and those of edge-light type using a light-guide plate.

In general, the backlight unit of the liquid crystal display device is configured using an optical sheet or film (simply referred to as "sheet" hereinafter) having a condensing function, such as a prism sheet, lenticular lens sheet and so forth, collimating direction of emission of light from the light source to align to a front direction. For example, the prism sheet is configured as having a large number of prism components having a triangular section arranged on a light extraction side thereof, allowing the light incident on the prism sheet to refract and transmit therethrough, so as to collimate the light to the front direction. The optical sheets other than the prism sheet include diffuser sheet having a function of diffusing light, and reflection-type polarizer having a function of polarizing light, which are used in combination with the prism sheet so as to make luminance of the liquid crystal display device uniform and intense.

On the other hand, bright-and-dark pattern (moire) due to interference of light may occur, ascribable to interaction between a pitch of arrangement of prisms on the prism sheet and pixel pitch on the liquid crystal display panel. Known methods of preventing the moire include a method of narrowing the pitch of arrangement of prism to as narrow as 100 μm or smaller, and a method of disposing a diffuser sheet between the prism sheet and the liquid crystal display panel (Japanese Patent Application Publication (KOKAI) No. Hei 6-1025061: Patent Document 1).

Alternatively, Japanese Patent Application Publication (KOKAI) No. 2004-46216 (Patent Document 2) discloses a configuration of a liquid crystal display device having a reflection-type, polarized-light separation element allowing a first linearly polarized light to transmit therethrough, and reflecting thereon a second linearly polarized light, disposed on the surface-of-incidence side or on the surface-of-extraction side of the prism sheet.

By the way, there has been a large trend of increasing screen size in the field of liquid crystal television set. With increase in the screen size, also optical sheets such as the diffuser sheet, prism sheet (or lens sheet), reflection-type polarizer sheet has been increased in size, wherein a problem has arisen in particular for the prism sheet (or lens sheet) and reflection-type polarizer sheet, having small thickness, in that they are very difficult to handle in the process of assembly. In addition, there has been much waste of side-components such as protective sheet placed on both surfaces of the optical sheet, when the optical sheet alone is transported.

Moreover, with increase in the screen size, illuminance of the light source becomes inevitably large in order to ensure a necessary level of brightness of the display surface. For this reason, also energy of heat applied to the surface having an increased area increases. Because of a large area of sheet, thus increased heat fails to conduct uniformly over the surface of sheet, so that the sheet never deforms uniformly. As a consequence, the contact between the optical sheets, or between the optical sheet and the liquid crystal display panel may occur, and thereby image quality of displayed image may degrade.

There is known a method of bonding the optical sheets to be stacked using a transparent adhesive over the entire surfaces thereof in the order of stacking, typically as described in Japanese Patent Application Publication (KOKAI) No. Hei 9-146093 (Patent Document 3). Thus-configured optical sheet stack may be improved in the rigidity by virtue of bonding of two or more optical sheets, may consequently be improved in the handleability in the process of assembly while suppressing deflection, and may be halved in consumption of the side-components. Bonding of the optical sheets may also improve the stiffness of sheet, and may make the sheet more resistant to thermal deformation.

SUMMARY

The configuration of bonding the optical sheets simply by placing an adhesive layer in between may raise a problem in that, for a case where the optical sheet to be stacked is a prism sheet or the like, having irregularities formed on the surface thereof, the prism-structured portions may get into the thickness of the adhesive layer, may degrade in that portions the light-condensing effect ascribable to the prism geometry, and may thereby lower the front luminance. The lowering in the front luminance may be more distinctive as the thickness of the adhesive layer becomes large. Meanwhile, it may not be preferable, as an effort of compensating the lowering in the luminance, to increase energy of light of the light source, because it may result in increase in the power consumption.

The present application provides in an embodiment an optical sheet stack and a liquid crystal display device, capable of preventing deflection of sheet, reducing the number of side-components, and preventing thermal deformation, while minimizing lowering in the front luminance.

According to an embodiment, there is provided an optical sheet stack containing a first optical sheet having a large number of irregularities consecutively arranged on one surface thereof, and a second optical sheet stacked thereon. In the optical sheet stack, the second optical sheet has, on the bonding surface thereof, an adhesive layer bonded with the apexes of the irregularities, and while assuming pitch of arrangement of the irregularities as P, and width of bonding of each apex of the irregularities bonded to the adhesive layer as Pw, the relation $0 < Pw/P \leq 0.2$ is satisfied.

The optical sheet stack according to an embodiment, having the first optical sheet and the second optical sheet bonded while placing the adhesive layer in between, may be raised in the rigidity of sheet, improved in the handleability by preventing the deflection, and prevented from being thermally deformed. Also consumption of the side-components such as protective films or the like may be halved.

By adopting a configuration in which the relation of $0<Pw/P\leq0.2$ is satisfied, in other words, by adjusting the width of bonding Pw of each apex of the irregularities in contact with the adhesive layer to not larger than 20% of the pitch of arrangement P of the irregularities, the optical sheet stack may be prevented from being degraded in the light-condensing function (or lens function) expressed by the irregularities, and may minimize decrease in the front luminance caused by interposition of the adhesive layer, while keeping a desirable level of adhesiveness between the first optical sheet and the second optical sheet. If $Pw/P>0.2$, area of contact between the irregularities and the adhesive layer will be too large, making degradation in the light-refracting effect at the contact region more distinctive, and thereby large decrease in the front luminance will be inevitable. More specifically, reduction in the luminance will be as close as 20%, and even will exceed 20% on occasions, as compared with the case where the first and the second optical sheets are simply stacked without bonding.

For an exemplary case where the pitch of arrangement P of the irregularities is as narrow as 100 μm or smaller, any effort of ensuring a desirable level of adhesion strength with the second optical sheet may largely lower the front luminance, because it is difficult to reduce the width of bonding Pw beyond a predetermined level relative to the pitch of arrangement P. On the contrary, any effort of reducing the width of bonding Pw aiming at suppressing lowering in the front luminance may fail in ensuring a necessary level of adhesion strength with the second optical sheet.

It is therefore preferable to adjust the pitch of arrangement P of the irregularities to 110 μm or larger. By widening the pitch of arrangement P of the irregularities, the width of bonding Pw may be expanded without largely degrading the front luminance. As a consequence, a desired level of adhesion strength with the second optical sheet may be ensured, while minimizing degradation in the front luminance. Widening of the pitch of arrangement of the irregularities also increases area of the prism slopes or lens surfaces composing the irregularities, so that the light-condensing effect or lens effect may be enhanced, and thereby the front luminance may be improved as compared with that in a narrow-pitch structure of 100 μm or smaller.

On the other hand, for a case where the optical sheet stack of the present invention is adopted to the backlight unit of the liquid crystal display device, increase in the pitch of arrangement of the irregularities may produce moire by interference between the irregularities and pixels of the liquid crystal display panel. For this reason, the present invention configures the second optical sheet using a diffuser sheet, and specifies the upper limit of the pitch of arrangement P so as to satisfy the relation of:

$(H/Tt)\cdot(Pp/P)\geq1.7$, assuming the pitch of arrangement of the irregularities as P [μm], haze value of the diffuser sheet as H [%], total transmissivity of light of the diffuser sheet as Tt [%], and pixel pitch of the liquid crystal display panel as Pp [μm].

The diffuser sheet as the second optical sheet is disposed on the light extraction side of the first optical sheet. The haze value H and the total transmissivity of light Tt of the diffuser sheet are characteristic values specific to each diffuser sheet, and are determined depending on configuration, type and specification of the diffuser sheet to be adopted. The haze value H indicates the degree of diffusion, wherein larger values thereof mean larger effects of diffusing light, and consequently mean larger degrees of moderating periodicity in the distribution of directionality of light emitted from the first optical sheet. Tt represents the total transmissivity of light of light transmitting through the diffuser sheet, and larger values thereof more largely contribute to improvement in the luminance. Generation of moire is caused by interference of light due to periodicity of the irregularities arranged on the first optical sheet and the periodicity of the pixel array on the liquid crystal display panel. By optimizing the characteristics of the diffuser sheet such as haze, total transmissivity of light and so forth, generation of the moire may be suppressed by virtue of moderated periodicity, and at the same time lowering in the front luminance may be suppressed.

Particular attention was made to the value of $(H/Tt)\cdot(Pp/P)$, where it was found out that the moire may be prevented from generating, while successfully suppressing lowering in the front luminance, when the value is 1.7 or larger. If $(H/Tt)\cdot(Pp/P)$ is smaller than 1.7, the moire may be more likely to occur, and the image quality may degrade as a consequence. For the purpose of improving the luminance, the pitch of arrangement P of the irregularities is preferably adjusted to 110 μm or larger, although it depends on the size of pixel pitch, or haze value and the total transmissivity of light of the diffuser sheet.

Geometry of the irregularities formed on the first optical sheet is not specifically limited, wherein preferable examples of which include not only prism components having a triangular section, but also lenticular lenses such as cylindrical lens component, lens component having hyperboloids or paraboloids, and lens component having aspherical surfaces of higher orders. By configuring the irregularities with the above-described lenticular lenses, not only the front luminance, but also the angle of viewing may be improved.

The second optical sheet bonded to the first optical sheet is not limited to the diffuser sheet, and may be a reflection-type polarizer sheet allowing a first linearly polarized light to transmit therethrough, but reflecting thereon a second linearly polarized light, an optical sheet having both of diffusion function and reflection-type polarization separation function, or may simply be a transparent sheet.

Additional features and advantages are described herein, and will be apparent from, the following Detailed Description and the figures.

BRIEF DESCRIPTION OF THE FIGURES

FIGS. 2A and 2B are schematic perspective views of an optical sheet stack of the present invention, in which FIG. 2A shows an example having a prism sheet used as a light-condensing sheet, and FIG. 2B shows an example having a lenticular lens sheet used as a light-condensing sheet;

FIGS. 6A and 6B are sectional views showing essential portions of the optical sheet stack of the present invention, in which FIG. 6A is shows an exemplary case of using a prism sheet as the light-condensing sheet, and FIG. 6B shows an exemplary case of using a lenticular lens sheet as the light-condensing sheet;

FIG. 9 is a drawing showing results of experiments, made on various samples having projections formed on the back surfaces of the light-condensing sheet, investigated for relations between modes of formation of the projections and the front luminance;

DETAILED DESCRIPTION

Paragraphs below will explain an embodiment referring to the attached drawings.

Figure 1:
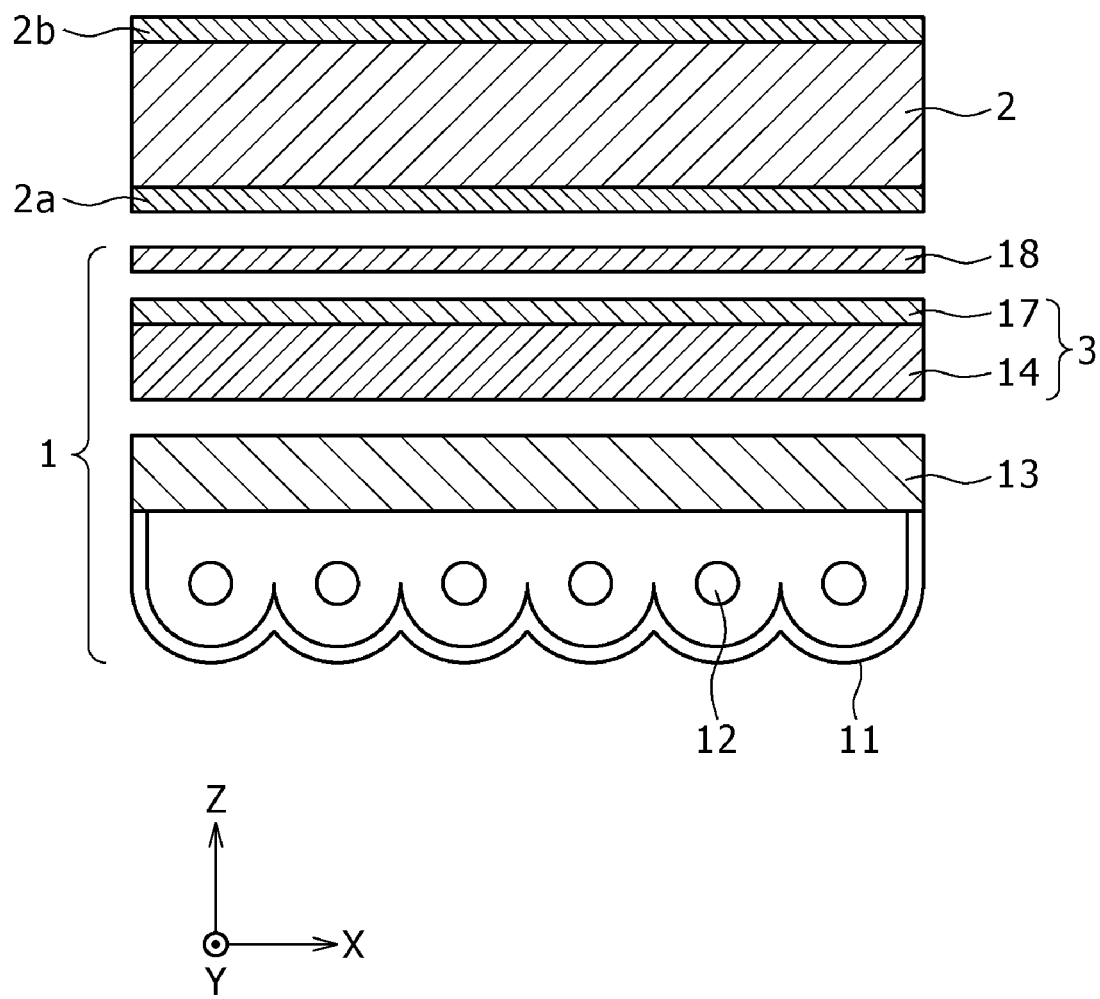
FIG. 1 is a schematic drawing of a configuration of a liquid crystal display device according to one embodiment.

FIG. 1 is a sectional view showing a schematic configuration of a liquid crystal display device 10 according to one embodiment.

First, the configuration of the liquid crystal display device 10 will schematically be explained.

As shown in FIG. 1, the liquid crystal display device 10 has a backlight unit 1 and a liquid crystal display panel 2. Although the description hereinafter deals with an exemplary case of using a direct backlight unit, the backlight unit 1 may be configured using an edge light type one.

As shown in FIG. 1, the backlight unit 1 is aimed at supplying light to the liquid crystal display panel 2, and is disposed directly under the back surface of the liquid crystal display panel 2. The liquid crystal display panel 2 displays information thereon, using light supplied from the backlight unit 1 after modulating it on the time-space basis. The liquid crystal display panel 2 has polarizer plates 2a, 2b provided on both surfaces thereof. The polarizer plate 2a and the polarizer plate 2b allow only one of orthogonal polarized components of the incident light to transmit therethrough, and intercept the other by absorption. The polarizer plate 2a and the polarizer plate 2b are disposed, for example, so as to align the transmission axes thereof at right angles to each other.

The liquid crystal display panel 2 has a plurality of pixels arranged in the transverse direction and longitudinal direction of the panel at a predetermined pitch, and displays on the front surface thereof predetermined images by controlling pixel-by-pixel transmissivity of the light emitted by the backlight unit 1. The displayed images herein may be color images, but may not be limited thereto.

As shown in FIG. 1, the backlight unit 1 has, for example, a reflector plate 11, a light source 12, a diffuser plate 13, a light-condensing sheet 14, a diffuser sheet 17 and a reflection-type polarization separation sheet 18. It is also allowable herein to use a reflection-type polarization separation sheet having a diffusion functional layer, in place of the diffuser sheet 17 and the reflection-type polarization separation sheet 18. The diffuser plate 13 and the reflection-type polarization separation sheet 18 may be omissible if occasions demand.

The light source 12 is aimed at supplying light to the liquid crystal display panel 2, a plurality of which being disposed in the illustrated example, and is configured with fluorescent lamps (FL), electroluminescence (EL) elements, light-emitting diodes (LED) or the like.

The reflector plate 11 is provided so as to cover the bottom and lateral portions of the light source 12. The reflector plate 11 is aimed at reflecting the light emitted from the light sources 12 downwards or sidewards, and at directing it towards the liquid crystal display panel 2.

The diffuser plate 13 is provided above the light sources 12. The diffuser plate 13 is aimed at diffusing the light emitted from the light sources 12 and the light reflected on the reflector plate 11 so as to make the luminance uniform. The diffuser plate 13 adopted in this case is, for example, a relatively thick one having light-diffusing particles dispersed in a transparent material.

The light-condensing sheet 14 functions as a first optical sheet, and is disposed above the diffuser plate 13. The light-condensing sheet 14 is aimed at improving directionality of irradiated light emitted from the diffuser plate 13. Configuration of the light-condensing sheet 14 will be detailed later.

The diffuser sheet 17 functions as a second optical sheet, and is disposed on the light-condensing sheet 14. The diffuser sheet 17 is aimed at allowing the light improved in the directionality by the light-condensing sheet 14 to emit as being diffused within a predetermined angular range. As the diffuser sheet 17 in this example, a transparent sheet base having on the light-extraction side thereof a diffusive surface such as light-diffusive irregular structure or the like.

The reflection-type polarization separation sheet 18 is provided over the diffuser sheet 17. The reflection-type polarization separation sheet 18 is aimed at allowing only one of orthogonal polarized components of the light diffused by the diffuser sheet 17 to transmit therethrough, and reflecting the other. Direction of oscillation of the polarized component transmitted through the reflection-type polarization separation sheet 18 is set in parallel with the transmission axis of the polarizer plate 2a disposed on the surface-of-incidence side of the liquid crystal display panel 2.

In this embodiment, the above-described light-condensing sheet 14 and the diffuser sheet 17 are configured as an optical sheet stack 3 bonded in an integrated manner while placing an adhesive layer in between. Paragraphs below will detail the configuration of the optical sheet stack 3.

Figure 2A:
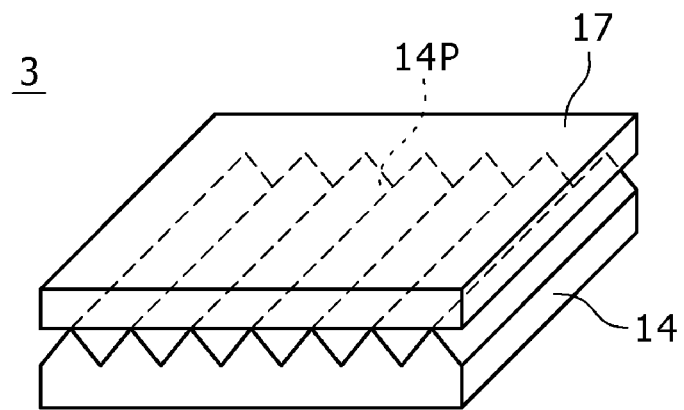
Figure 2A:
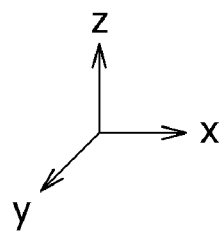
Figure 2B:
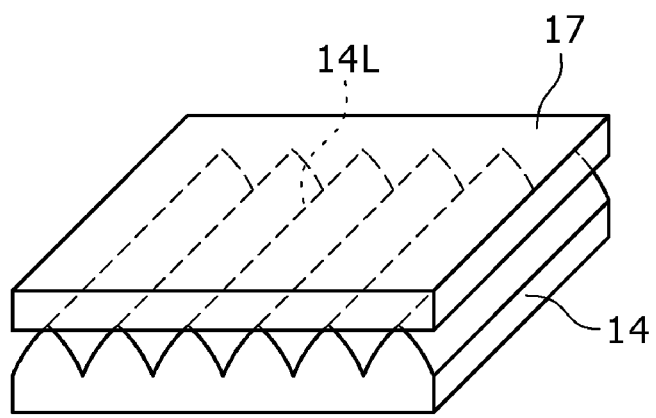

FIGS. 2A and 2B are overall perspective views schematically showing exemplary configurations of the optical sheet stack 3. The light-condensing sheet 14 has a nearly rectangular sheet form, and is configured as a prism sheet or a lenticular lens sheet having a large number of irregularities having light-condensing function, in a form of prism component or lens component, consecutively arranged on one main surface thereof in one direction (X-direction in the drawing). The optical sheet stack 3 is configured by the light-condensing sheet 14 and the nearly planar diffuser sheet 17 bonded thereto. The sheet in the context of this patent specification includes, not only films, but also various thin plate products having flexibility, or certain degrees of hardness or stiffness.

The optical sheet stack 3 shown in FIG. 2A is configured as having the diffuser sheet 17 bonded to the light-condensing sheet 14 composed of a prism sheet having, as the irregularities, a large number of prism components 14P, each having a nearly triangular section, arranged on the surface of light-extraction side. On the other hand, the optical sheet stack 3 shown in FIG. 2B is configured as having the diffuser sheet 17 bonded to the light-condensing sheet 14 composed of a lenticular lens sheet having, as the irregularities, a large number of lenticular lens components 14L, each having hyperboloids or paraboloids, or aspherical surfaces of higher orders, arranged on the surface of light-extraction side.

The sectional geometry of each prism component 14P in this example may be configured by an isosceles triangle having an apex angle of 90°, but the isosceles triangle may not be limited to those having an apex angle of 90°. Also height and pitch of the prism are not specifically limited, wherein the upper limit will be set to the pitch of arrangement of the prisms as described later.

On the other hand, while assuming the Z-axis in parallel with the direction of the normal line on the light-condensing sheet 14, the X-axis in the direction of arrangement of the lens components 14L, and the Y-axis in the direction of the generatrix (direction of the ridgeline) of the lens components 14L, each lens component 14L is formed so as to satisfy the equation (1) below, as allowing a finite focal length to exist on the extraction side of the irradiated light, and as having a laterally symmetrical sectional geometry surrounded by hyperboloids or paraboloids:

$$Z=X^2/(R+\sqrt{(R^2-(1+K)X^2)}) \quad (1),$$

where R is radius of curvature [μm] of the apex, and K is Conic constant. In this patent specification, "$\sqrt{}$" means a square root of a value determined by the mathematical formula following thereafter.

Alternatively, while similarly assuming the Z-axis, the X-axis and the Y-axis, each lenticular lens component 14L is formed so as to satisfy the equation (2) below, as allowing a finite focal length to exist on the extraction side of the irradiated light, and as having a laterally symmetrical sectional geometry surrounded by aspherical surfaces:

$$Z=X^2/(R+\sqrt{(R^2-(1+K)X^2)})+AX^4+BX^5+CX^6+\ldots \quad (2),$$

where R is radius of curvature [μm] of the apex, K is Conic constant, and A, B, C, . . . are aspherical coefficients.

Figure 3:
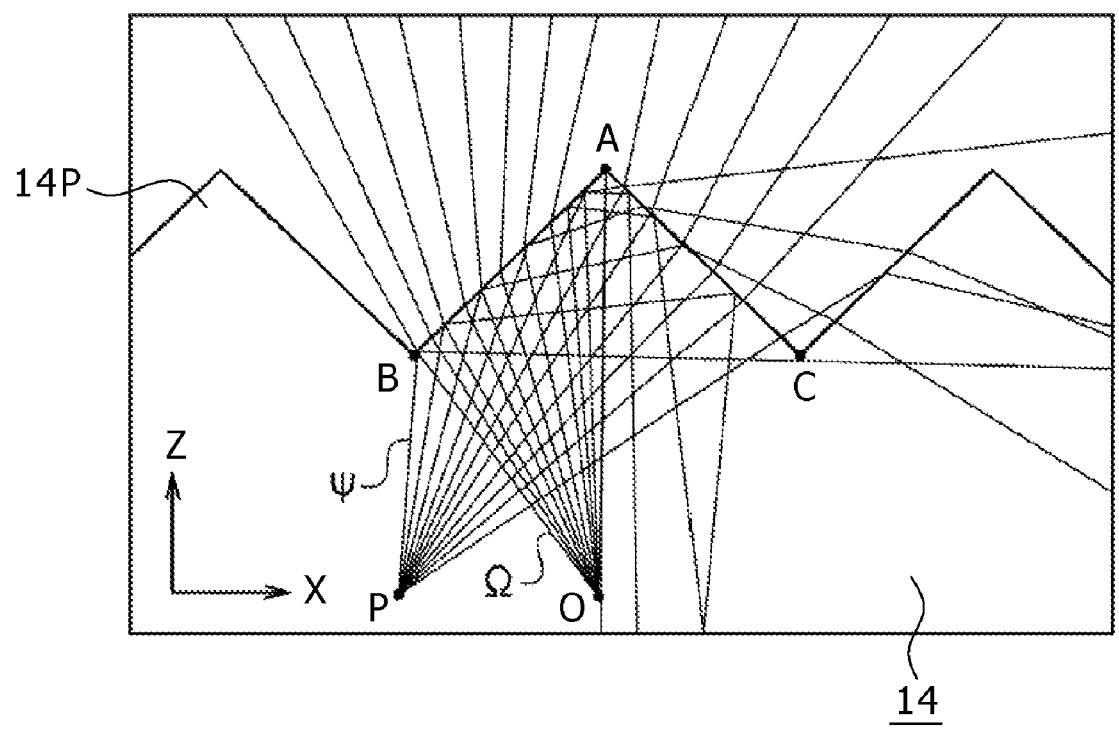
FIG. 3 is a drawing explaining trajectories of light incident on the prism sheet as the light-condensing sheet.

FIG. 3 is an enlarged view of the XZ section of the light-condensing sheet (prism sheet) 14 only, composing the optical sheet stack 3 shown in FIG. 2A. In FIG. 3, point A represents the apex of the prism component 14P, and each of point B and point C represents a contact point of the adjacent prism components 14P. Point O represents a virtual origin of light located directly under the apex A, and point P represents a virtual origin of light located directly under the contact point B. FIG. 3 shows trajectories of flux of light Ω coming from the virtual origin of light O and incident on the AB plane, and trajectories of flux of light Ψ coming from the virtual origin of light P and incident on the AB plane and the AC plane. These trajectories of the flux of light Ω and of the flux of light Ψ are determined by simulation.

In the light-condensing sheet 14 shown in FIG. 3, the incident light may transmit in different routes depending on the angle of incidence. The flux of light Ω becomes primary component of transmitted light transmitting the prism slope (AB plane) while being refracted, and is effectively used for improving the front luminance. The flux of light Ψ is divided into returned component of light returned to the side of incidence, after being reflected on one prism slope (AB plane) and then reflected again on the other prism slope (AC plane), and secondary component of transmitted light emitted forwardly from the prism after transmitting through the prism slope (AC plane). The returned component of light enters the diffuser plate 13 assumed as the light-emitting surface (planar light source) and is diffused and reflected, serving as an effective component of flux of light for increasing the luminance of the light-emitting surface. In contrast, the secondary component of transmitted light is emitted at wider angles beyond the effective angle of viewing of the liquid crystal display panel 2, and is not contributive to improvement in the luminance.

As learned from the above, in the light-condensing sheet (prism sheet) 14 shown in FIG. 3, the incident light is condensed towards the front direction through refractive transmission, so that the directivity is improved so as to enhance the front luminance. The front luminance is also improved by the reflected light which is diffused and scattered by the diffuser plate 13, assumed as the light-emitting surface (planar light source), and thereby improves the luminance of the light-emitting surface.

Figure 4:
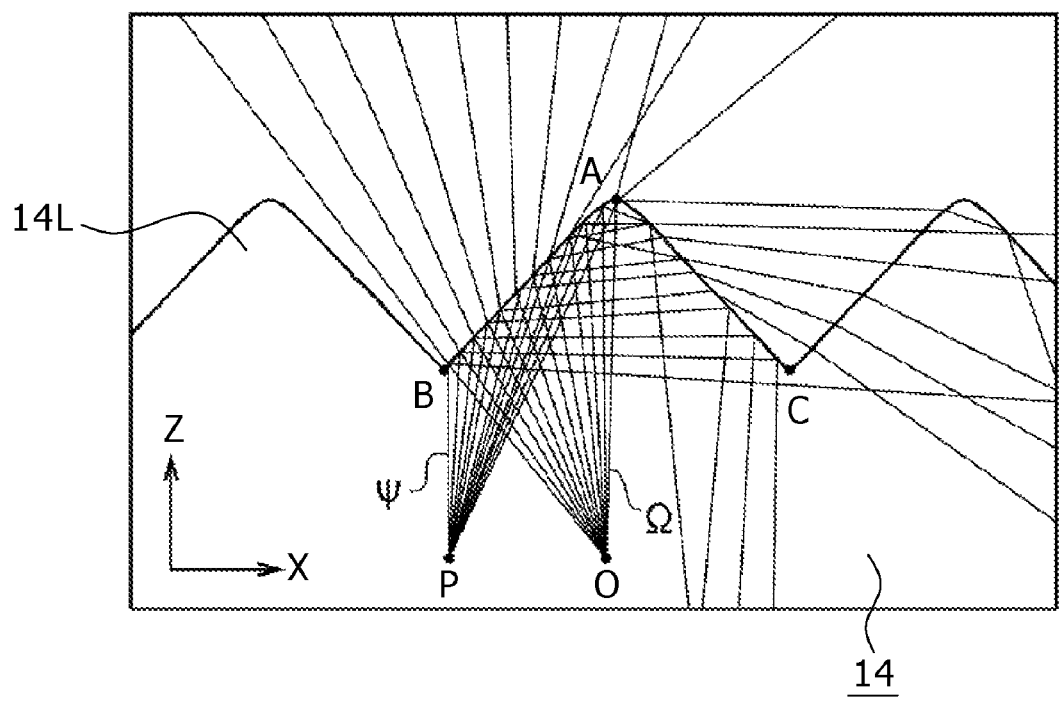
FIG. 4 is a drawing explaining trajectories of light incident on the lenticular lens sheet having hyperboloid geometry as the light-condensing sheet.

On the other hand, FIG. 4 is an enlarged view of the XZ section of one exemplary configuration, showing only the light-condensing sheet (lenticular lens sheet) 14 composing the optical sheet stack 3 shown in FIG. 2B. The lens component 14L shown in FIG. 4 has a hyperboloid geometry expressed by the equation (1) substituted by 1 [μm] for R, and −2 for K $$Z=X^2/(1+\sqrt{(1+X^2)})$$

As shown in FIG. 4, the flux of light Ω refractively transmits forwardly through the lens sheet 14. Almost entire portion of the flux of light Ψ becomes the returned component of light, after being totally reflected on the surface between points A and B, and being refracted or totally reflected on the surface between points A and C. The refracted light at the surface in the vicinity of the apex is diffused in the directionality thereof while being affected by changes in the direction of normal line, and thereby generation of the secondary component of transmitted light is moderated.

Figure 5:
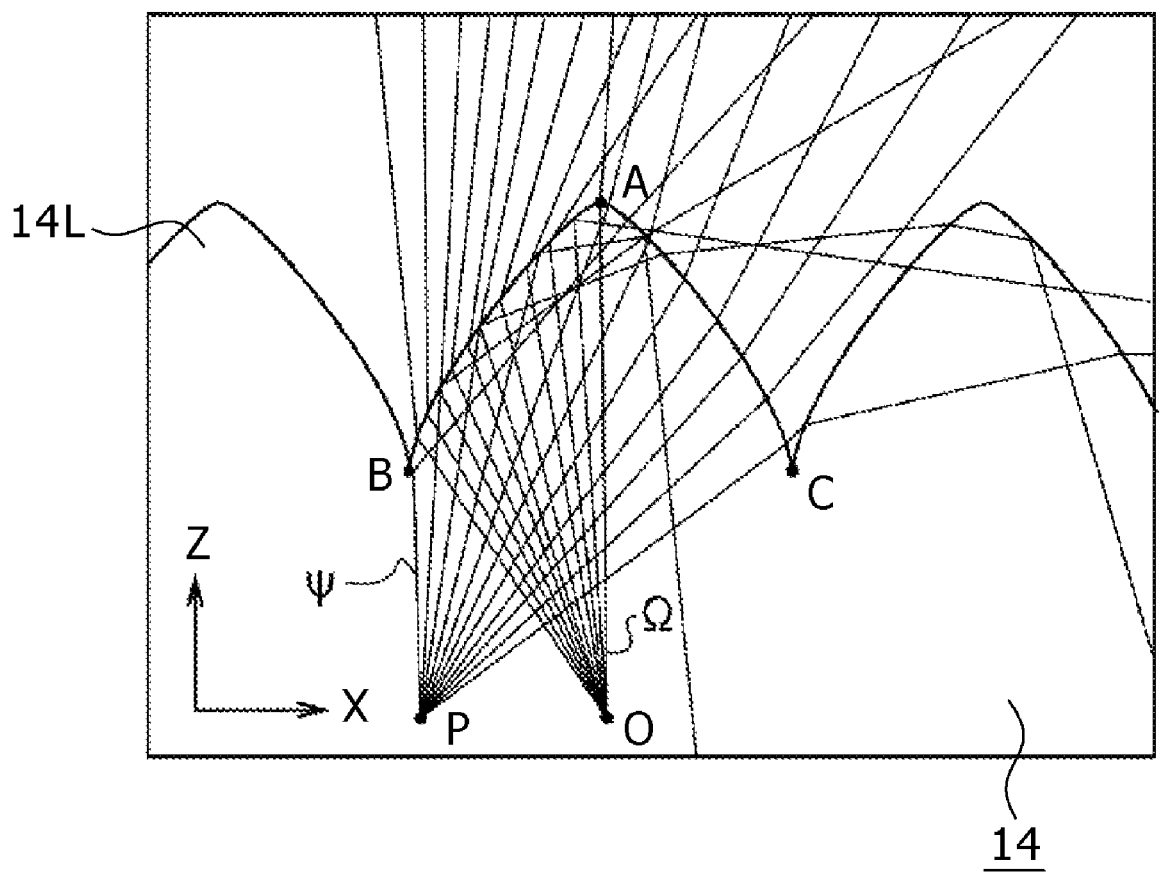
FIG. 5 is a drawing explaining trajectories of light incident on the lenticular lens sheet having an aspherical geometry as the light-condensing sheet.

FIG. 5 is an enlarged view of the XZ section of another exemplary configuration, showing only the light-condensing sheet (lenticular lens sheet) 14 composing the optical sheet stack 3 shown in FIG. 2B. The lens component 14L shown in FIG. 5 has an aspherical surface geometry expressed by the equation (2) substituted by 1 [μm] for R, −2 for K, 1×10$^{-5}$ for A, 0 for B, 2×10$^{-5}$ for C, and 0 for D, E, . . . .

$$Z=X^2/(1+\sqrt{(1+X^2)})+10^{-5}X^4+2\times10^{-5}X^6$$

As shown in FIG. 5, part of the flux of light Ω emitted from the virtual origin of light O causes total reflection on the surface in the vicinity of the apex A, and improves, as the returned component of light, the front luminance in an auxiliary manner. The flux of light Ψ emitted from the virtual origin of light P is effectively used for improving the front luminance, after being refractively transmitted through the surface between points A and B, and through the surface between points A and C.

Figure 6A:
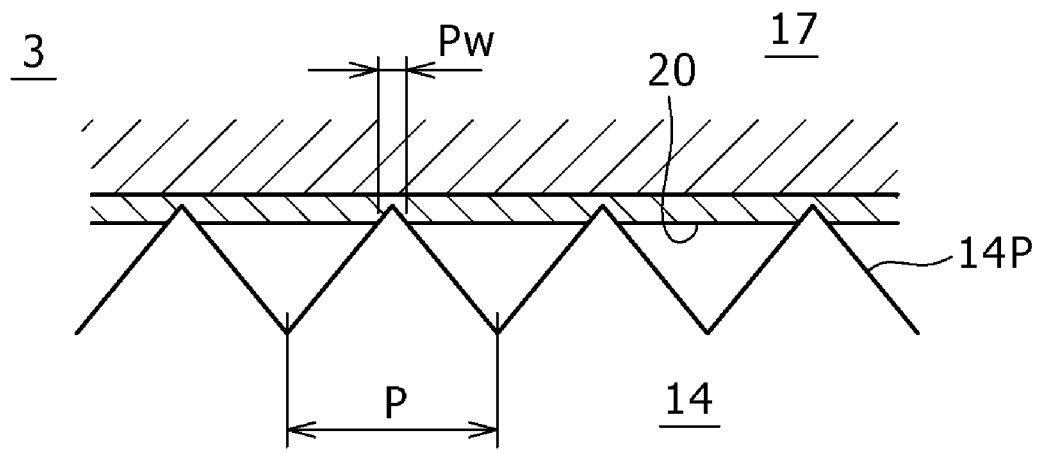
Figure 6B:
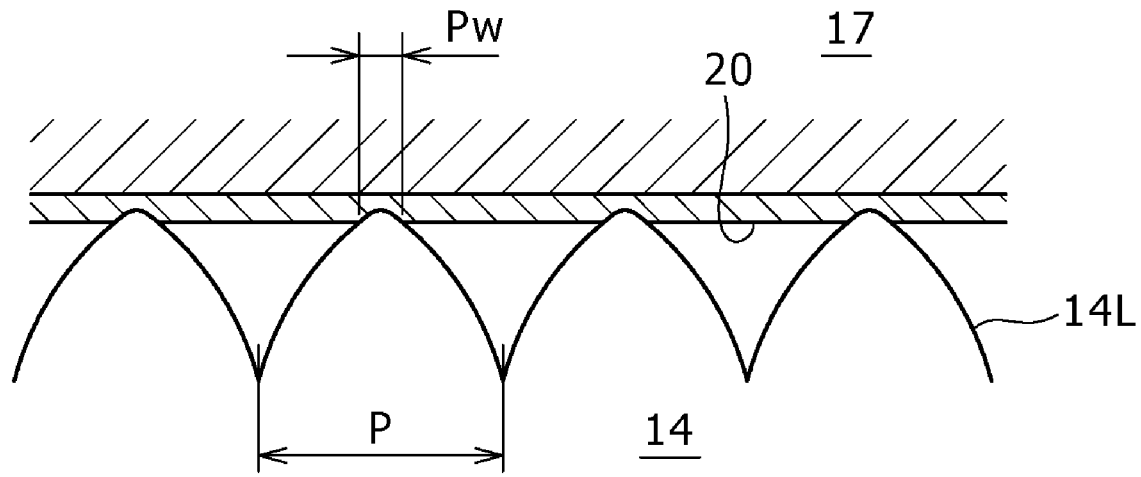

FIGS. 6A and 6B are sectional views of essential portions schematically showing contact portions between the light-condensing sheet 14 and the diffuser sheet 17 in the optical sheet stack 3 shown in FIGS. 2A and 2B. As shown in FIGS. 6A and 6B, the light-condensing sheet 14 and the diffuser sheet 17 are bonded while placing an adhesive layer 20 in between. The adhesive layer 20 is preliminarily formed on the surface-of-incidence side of the diffuser sheet 17, wherein bonding of the apexes of the irregularities (prism components 14P, lens components 14L) of the light-condensing sheet 14 to the adhesive layer 20 allows integration of the light-condensing sheet 14 and the diffuser sheet 17.

Adhesive materials composing the adhesive layer 20 are not specifically limited so far as they have transmissivity of light, applicable examples of which include acryl-base pressure sensitive adhesive, pressure sensitive adhesive composed of ethylene-vinyl acetate copolymer, hot-melt pressure sensitive adhesive, thermosetting adhesive cyano acrylatebase adhesive categorized as reactive adhesive, epoxy adhesive, ultraviolet curing resin and electron beam curing resin.

In this embodiment, the width of bonding Pw of the apexes of the prism components 14P or the lens components 14L bonded to the adhesive layer 20 is determined so as to satisfy the expression (3) below, in relation to the pitch of arrangement P of the irregularities 14P, 14L:

$$0 < Pw/P \leq 0.2 \quad (3).$$

By configuring the width of bonding Pw of each apex of the irregularities 14P, 14L in contact with the adhesive layer 20 to not larger than 20% of the pitch of arrangement P of the irregularities as described in the above, the optical sheet stack may be prevented from being degraded in the light-condensing function or lens function expressed by the irregularities 14P, 14L explained previously referring to FIG. 3 to FIG. 5, and may minimize decrease in the front luminance caused by interposition of the adhesive layer 20, while keeping a desirable level of adhesiveness between the light-condensing sheet 14 and the diffuser sheet 17.

In other words, if Pw/P>0.2, the contact area between the irregularities 14P, 14L and the adhesive layer 20 becomes large, and decrease in the effect of refracting light in the contact region becomes more distinct, and thereby a large decrease in the front luminance may be inevitable. More specifically, decrease in the front luminance may reach almost close to 20%, and may sometimes even exceed 20%, of the front luminance obtained for the case where the light-condensing sheet 14 and the diffuser sheet 17 are simply stacked without bonding (see Examples described later).

Therefore in the optical sheet stack 3 of this embodiment, the pitch of arrangement P of the irregularities 14P, 14L, and the width of bonding Pw of the irregularities 14P, 14L in contact with the adhesive layer 20 is determined so as to satisfy the equation (1) in the above. This may bring advantages ascribable to sheet bonding structure by virtue of improved stiffness, such as prevention of deflection and improvement in handleability, prevention of thermal deformation, and reduction in consumption of side-components such as protective films and so forth, while minimizing the rate of reduction in the luminance. Value of Pw/P herein may arbitrarily be set depending on geometry of the apexes of the irregularities 14P, 14L, pitch of arrangement, height, and adhesion strength of the adhesive layer 20, and may be set preferably to 0<Pw/P<0.2, and more preferably 0<Pw/P≦0.16.

Also the thickness of the adhesive layer 20 may arbitrarily be set similarly depending on the geometry of the apexes of the irregularities 14P, 14L, pitch of arrangement, height, adhesion strength of the adhesive layer 20, depth of bonding of the irregularities, and so on. For an exemplary case where the irregularities are configured as the prism components having an apex angle of 90°, and both sheets are bonded so as to allow the apexes of the irregularities to penetrate the adhesive layer to reach the back surface of the diffuser sheet, while considering that the upper limit of the width of bonding Pw is 0.2P, and that the apex angle of the irregularities is 90°, the upper limit of thickness of the adhesive layer 20 is given as 0.2P/2=0.1P, that is, 10% of the pitch of arrangement P.

It is now anticipated that, for a case where the pitch of arrangement P of the irregularities is as narrow as 100 μm or smaller, any effort of ensuring a desirable level of adhesion strength between the light-condensing sheet 14 and the diffuser sheet 15 may fail in reducing the width of bonding Pw beyond a predetermined ratio with respect to the pitch of arrangement P. On the contrary, any effort of reducing the width of bonding Pw aiming at suppressing lowering in the front luminance may fail in ensuring a desirable level of adhesion strength.

For this reason, the pitch of arrangement P of the irregularities is preferably adjusted to 110 μm or larger. Widening of the pitch of arrangement P of the irregularities may expand the width of bonding Pw, without largely degrading the front luminance. As a consequence, a desirable level of adhesion strength with respect to the second optical sheet may be ensured, while minimizing lowering in the front luminance. Because increase in the pitch of arrangement of the irregularities increases the area of the prism slope or lens surfaces composing the irregularities, and thereby enhances the light-condensing effect or lens effect, it becomes also possible to improve the front luminance as compared with that in a narrow-pitch structure of 100 μm or smaller.

Figure 7:
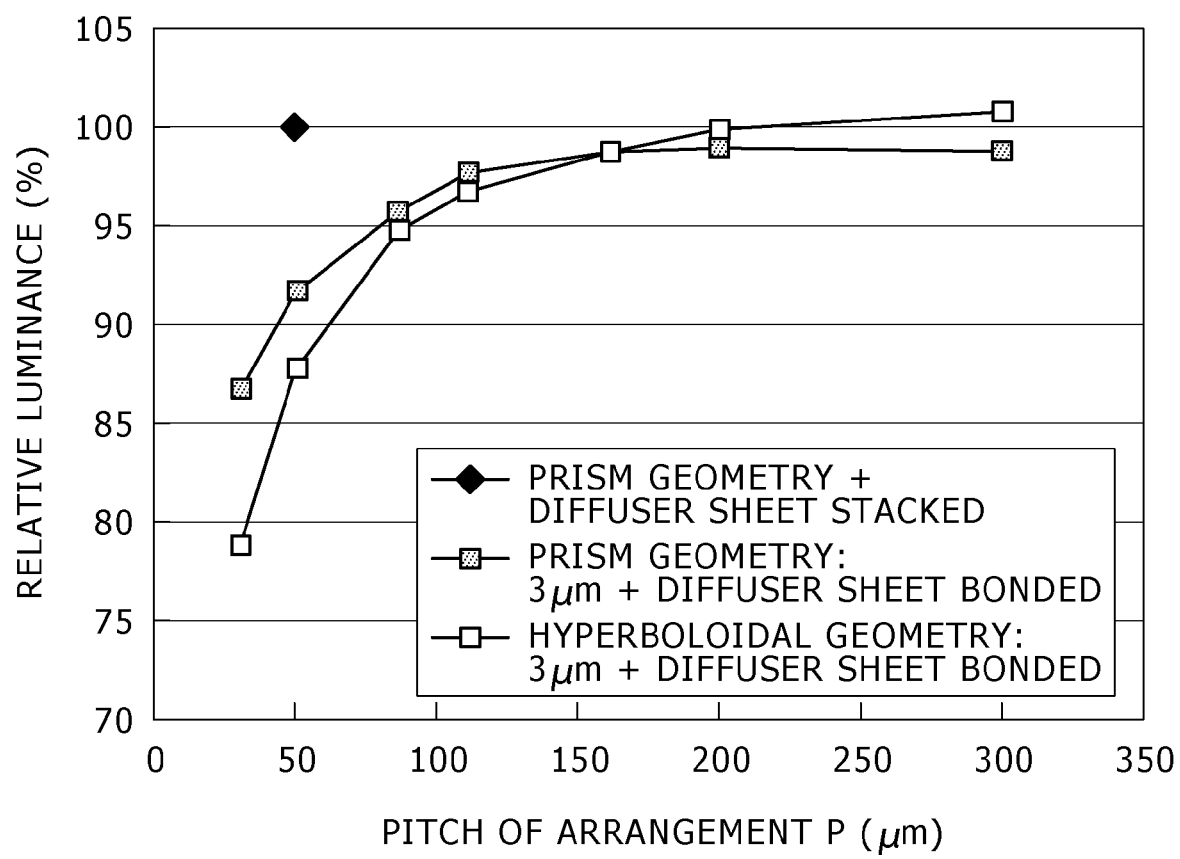
FIG. 7 is a drawing explaining relations between pitch of arrangement of the irregularities of the light-condensing sheet and the front luminance.

FIG. 7 shows exemplary relations between the pitch of arrangement P of the irregularities and the front luminance of the optical sheet stack. The abscissa represents the pitch of arrangement P [μm] of the irregularities, and the ordinate represents the relative luminance [%] with respect to the front luminance of a comparative sheet stack (corresponding to "prism geometry+diffuser sheet stacked") in which a prism sheet having the prism components with an apex angle of 90° are arranged thereon at a 50-μm pitch, is stacked with a diffuser sheet, without placing the adhesive layer in between.

FIG. 7 shows results of an optical sheet stack composed of a prism sheet having the prism components 14P with an apex angle of 90°, and a diffuser sheet bonded thereto while placing the adhesive layer (3 μm thick) in between, and an optical sheet stack composed of a lenticular lens sheet having the lens components 14L surrounded by the hyperboloids expressed by the equation (1) in the above, and a diffuser sheet bonded thereto while placing the adhesive layer (3 μm thick) in between. The diffuser sheets bonded to the prism sheet and the lens sheet are same as that composing the comparative sheet stack. The pitches of arrangement of the prism sheet and the lens sheet were adjusted to 30 μm, 50 μm, 85 μm, 110 μm, 160 μm, 200 μm, and 300 μm.

As shown in FIG. 7, there are general tendencies in that the front luminance increases as the pitch of arrangement P increases. However, rate of increase in the luminance becomes distinctively dull at around P=110 μm, and no more largely increases if the pitch of arrangement P is widened beyond that level. The reason why the luminance of the lenticular lens sheet is smaller than the luminance of the prism sheet at the same pitch of arrangement resides in that the slope (irregular surface) of the lens component 14L is curved, unlike that of the prism component 14P. Influence of being curved in the irregular surface appears more distinctively in lowering in the luminance as the pitch of arrangement becomes finer. However, widening of the pitch of arrangement may moderate the influence, showing the luminance equivalent to that of the prism sheet at P=160 μm, and showing the luminance larger than that of the prism sheet in the region of P>160 μm.

As described above, the front luminance may be improved by widening the pitch of arrangement P of the irregularities 14P, 14L. By widening the pitch of arrangement P up to 110 μm or beyond, it becomes also possible to suppress lowering in the luminance relative to the comparative sheet stack, and to reduce influence of lowering in the luminance caused by interposition of the adhesive layer.

By the way, it is anticipated that widening of the pitch of arrangement P of the irregularities 14P, 14L may induce moire, due to interference with the pixel pitch of the liquid crystal display panel 2. Although anticipation of generation of moire might be cleared by making the pitch of arrangement P finer, obtainable front luminance becomes lower (see FIG. 7).

Now in this embodiment, the pitch of arrangement P of the irregularities 14P, 14L of the light-condensing sheet 14 is determined depending on diffusion characteristics of the diffuser sheet 17 and the size of pixel pitch of the liquid crystal display panel 2. More specifically, the liquid crystal display device 10 of this embodiment is configured so as to satisfy the expression (4) below, assuming the pitch of arrangement of the irregularities 14P, 14L as P [μm], haze value of the diffuser sheet 17 as H [%], total transmissivity of light of the diffuser sheet 17 as Tt [%], and the pixel pitch of the liquid crystal display panel 2 as Pp [μm]:

$$(H/Tt)\cdot(Pp/P) \geq 1.7 \qquad (4).$$

The expression solved with respect to P gives:

$$P \leq (H \cdot Pp)/(1.7Tt) \qquad (5).$$

The expression (5) in the above expresses the upper limit of the pitch of arrangement P of the irregularities 14P, 14L of the light-condensing sheet 14. More specifically, the pitch of arrangement P exceeding the value of (H·Pp)/(1.7Tt) may be more likely to cause moire and consequently lower the image quality as described later in Examples, due to interference of light between the optical sheet stack 3 and the liquid crystal display panel 2. Therefore by limiting the pitch of arrangement P up to the value of (H·Pp)/(1.7Tt), high-quality image without causing moire may be obtained.

As shown in FIG. 1, the diffuser sheet 17 is disposed on the light extraction side of the light-condensing sheet 14. The haze value H and total transmissivity of light Tt of the diffuser sheet 17 are characteristic values unique to the individual diffuser sheets, and are determined depending on configuration, type and specification of the diffuser sheet 17 to be adopted. The haze value H indicates the degree of diffusion, wherein larger values thereof mean larger effects of diffusing light, and consequently mean larger degrees of moderating periodicity in the distribution of directionality of light emitted from the light-condensing sheet 14. Tt represents the total transmissivity of light of light transmitting through the diffuser sheet, wherein larger values thereof more largely contribute to improvement in the luminance.

In contrast, the pixel pitch Pp of the liquid crystal display panel 2 may vary depending on the screen size and the number of pixels of the liquid crystal display panel 2. For example, the pixel pitch is 320 μm for 19-inch screens, 460 μm for 40-inch screens adopted to high-definition (HD) display, and 510 μm for 32-inch screen. The upper limit of the pitch of arrangement P of the irregularities of the light-condensing sheet 14 consequently increases as the size of pixel pitch Pp increases.

Figure 8:
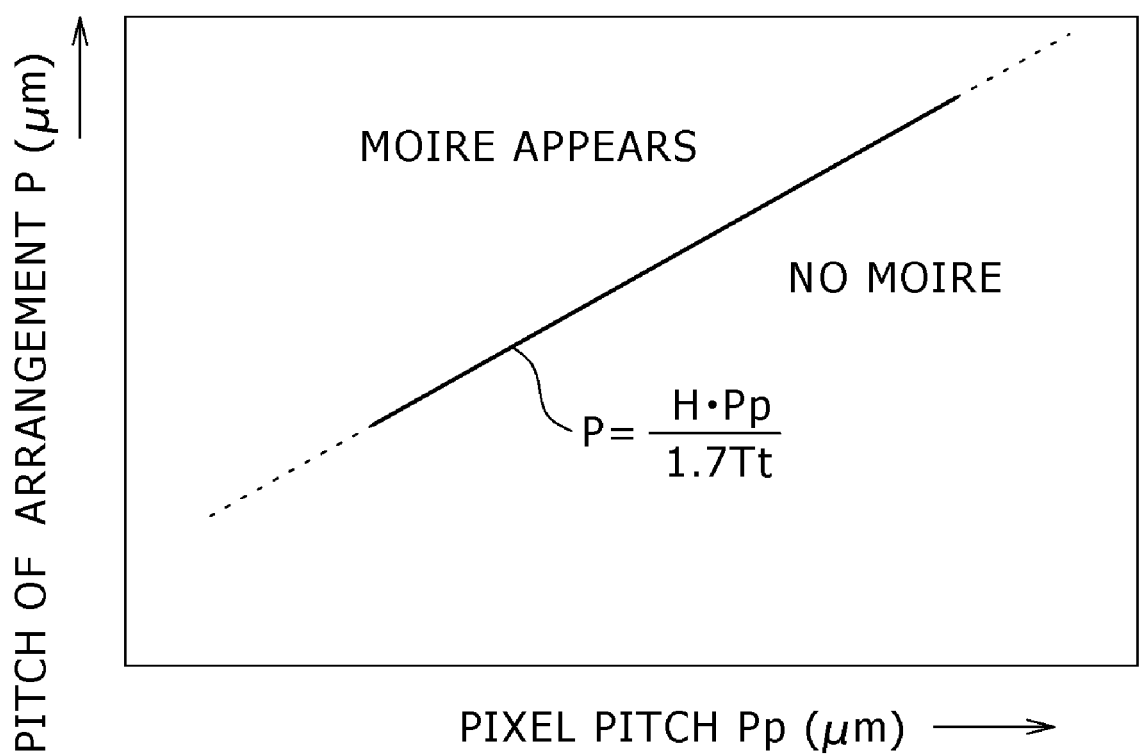
FIG. 8 is a drawing showing a relation between the pixel pitch of a liquid crystal display panel and the pitch of arrangement of the irregularities.

FIG. 8 shows a relation between the pixel pitch Pp and the pitch of arrangement P. The upper limit of the pitch of arrangement P is determined by the linear expression P=(H·Pp)/(1.7Tt). This embodiment enables optimum design of the light-condensing sheet 14 adapted to required characteristics of luminance, while avoiding moire-induced degradation in image quality, by designing the pitch of arrangement P based on the expression (5).

The upper limit of the pitch of arrangement P is not specifically limited, because it varies depending on the diffusion characteristics (H, Tt) of the diffuser sheet 17, or size of pixel pitch Pp of the liquid crystal display panel 2, wherein the pitch of arrangement P for a pixel pitch of 320 μm or larger and 510 μm or smaller may be set, for example, to 110 μm or larger and 350 μm or smaller.

As for the light-condensing sheet 14 having the lens components 14L having the hyperboloids or the paraboloids expressed by the equation (1), the radius of curvature R [μm] of the apexes, in relation to the pitch of arrangement P, and Conic constant K are preferably adjusted to the numerical ranges of $0<R<P$ and $-4<K\leq-1$, more preferably $0<R<P/2$ and $-3<K\leq-1$, and still more preferably $0<R<2P/5$ and $-3<K\leq-1$, respectively.

For the case where each lens component 14L has an aspherical geometry expressed by the equation (2) in the above, the radius of curvature R [μm] of the apexes, Conic constant K, and aspherical coefficients A, B, C, . . . are preferably adjusted to the numerical ranges of $R\geq0$, $K<-1$, $0<A<10^{-3}$ and $0\leq B, C, \ldots <10^{-3}$, and more preferably $0<R\leq72$, $-15<K\leq-1$ and $0<A, B, C, \ldots <10^{-3}$.

Next paragraphs will explain a configuration of the other main surface of the light-condensing sheet 14, that is, the back surface opposite to the front surface, in a case where the front surface is assumed as having the prism components 14P or the lens components 14L formed thereon.

The other surface side (back surface side) of the light-condensing sheet 14 is configured as a flat surface, and has fine projections, not shown, formed on the surface thereof. By virtue of this configuration, the back surface of the light-condensing sheet 14 is prevented from getting scratches due to sliding, and the luminance characteristics may be improved by reducing reflectivity of light coming from the light source side.

Height of the projections provided on the back surface of the light-condensing sheet 14 is not specifically limited, but is preferably adjusted to 0.20 μm or larger above the averaged center level (JIS B0601-1994). Density of the projections having a height of 0.20 μm or larger above the averaged center level is preferably adjusted to 70/mm2 or larger and 400/mm2 or smaller. By limiting the density of projections to 70/mm2 or larger, visible blurring caused by interference with the planar portion of the diffuser plate 13 disposed on the back side of the light-condensing sheet 14 may be ameliorated. By limiting the density of projections to 400/mm2 or smaller, lowering in luminance of the liquid crystal display device, ascribable to provision of the projections on the back surface side of the light-condensing sheet, may be suppressed.

Average distance between the adjacent projections having a height of 0.20 μm or larger above the averaged center level is preferably adjusted to a range from 50 μm or above and 120 μm or below. By limiting the average distance of the projections to 50 μm or longer, lowering in luminance of the liquid crystal display device, ascribable to provision of the projections on the back surface side of the light-condensing sheet, may be suppressed. By limiting the average distance of the projections to 120 μm or shorter, the diffuser plate 13 is prevented from getting scratches due to contact with the back surface of the light-condensing sheet 14, and visible blurring caused by interference with the planar portion of the diffuser plate 13 may be ameliorated.

The projections on the back surface of the light-condensing sheet 14 are preferably provided so as to achieve a haze of the light-condensing sheet of 60% or smaller, and more preferably 20% or smaller, when the light-condensing sheet 14 has no prism components 14P nor lens components 14L formed on the surface thereof. Average slope of the back surface of the light-condensing sheet 14 having the projections formed thereon, is preferably adjusted to 0.25 rad or smaller.

The average slope is given by the equation below, while assuming the X- and Y-axes of an orthogonal coordinate system on the center of a roughness curve, assuming Z-axis normal to the center plane, and assuming roughness curved surface as f(x,y), and size of reference plane as Lx, Ly, where SM is given as Lx×Ly.

$$\delta a = \frac{1}{S_M} \int_0^{L_x} \int_0^{L_y} \sqrt{\left(\frac{\partial f}{\partial x}\right)^2 \left(\frac{\partial f}{\partial y}\right)^2} \, dx \, dy \quad \text{[Mathematical Formula 1]}$$

FIG. 9 shows interrelations of haze of sheet, average slope of the back surface of sheet, and front luminance of the liquid crystal display device observed on various samples having projections of various geometries formed on the back surfaces of the light-condensing sheet, but having no lens pattern formed thereon. The front luminance is expressed by relative values on the basis of luminance value of sample S1. By adjusting the haze to 60% or smaller, and the average slope to 0.25 rad or smaller, lowering in luminance of the liquid crystal display device, ascribable to provision of the projections on the back surface side of the light-condensing sheet 14, may be suppressed.

Although average roughness of the projections provided on the back surface of the light-condensing sheet 14 is not specifically limited, they are preferably provided so as to make ten-point average roughness SRz fall within a range from 1 μm or above and 15 μm or below. By limiting the ten-point average roughness SRz of the projections to 1 μm or larger, the diffuser plate 13 may be prevented from getting scratched on the surface thereof, due to contact with the back surface of the light-condensing sheet 14, and visible blurring caused by interference with the planar portion of the diffuser plate 13 may be improved. By limiting the ten-point average roughness SRz of the projections to 15 μm or smaller, lowering in luminance of the liquid crystal display device, ascribable to provision of the projections on the back surface side of the light-condensing sheet 14, may be suppressed.

Next, a method of manufacturing the light-condensing sheet 14 will be explained. In this embodiment, the light-condensing sheet 14 is manufactured by the fusion extrusion molding. The method is, however, not limited thereto, allowing formation of irregularities such as prism components or cylindrical lens components on the sheet, by hot pressing or transfer method using ultraviolet curing resins.

Figure 10:
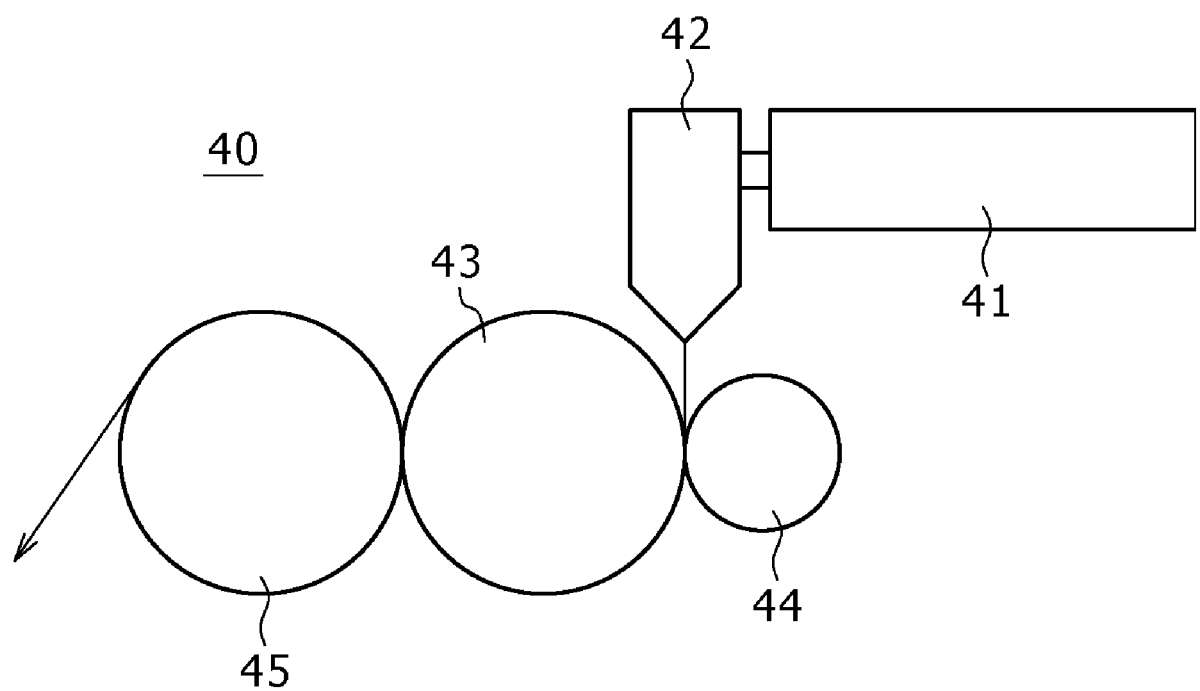
FIG. 10 is a schematic drawing showing a configuration of a molding machine used for manufacturing the light-condensing sheet by fusion extrusion molding.

FIG. 10 is a schematic drawing showing a configuration of an extrusion precision sheet forming machine 40 used for manufacturing the light-condensing sheet 14 in this embodiment. The extrusion precision sheet forming machine 40 has an extruder 41, a T-die 42, a forming roll 43, an elastic roll 44 and a cooling roll 45.

The extrusion machine 41 fuses a resin material fed through a hopper, not shown, and feeds it to the T-die 42. The T-die 42 is a die having a straight slit-like opening, and allows the resin material fed from the extrusion machine 41 to eject therethrough, while spreading it up to a necessary width of sheet.

The forming roll 43 has a columnar geometry, and is configured as being freely rotatable around the center axis thereof assumed as the axis of rotation. The forming roll 43 is configured as being coolable. More specifically, the forming roll 43 has, inside thereof, one or more fluid passageways allowing a coolant to flow therethrough. The coolant adoptable herein may be an oil medium, for example, wherein temperature of which is varied over the range from 90° C. to 270° C.

The forming roll 43 has, on the cylindrical surface thereof, an embossed pattern used for transferring an irregularity pattern onto one main surface of the sheet ejected from the T-die 42. The embossed pattern is, for example, a fine irregularity pattern used for transferring the prism components 14P or the lens components 14L shown in FIGS. 2A and 2B onto the sheet. The irregularity pattern is formed typically by precision cutting using a diamond bite. The embossed pattern is formed in the circumferential direction or in the width-wise (height-wise) direction of the forming roll 43 having a columnar geometry.

The elastic roll 44 has a columnar geometry, and is configured as being freely rotatable around the center axis thereof assumed as the axis of rotation. The surface of the elastic roll 44 is configured as being elastically deformable, and therefore as being compressible on the surface brought into contact with the forming roll 32, when the sheet is nipped by the forming roll 43 and the elastic roll 44.

The elastic roll 44 is covered with a seamless cylinder composed, for example, of a Ni plating, and having inside thereof an elastic component so as to make the surface of the elastic roll 44 elastically deformable. Materials composing the elastic roll 44 is not specifically limited so far as the surface thereof can elastically deform when brought into contact with the forming roll 43 under a predetermined pressure. Examples of the material include rubber material, metals and composite materials. The elastic roll 44 is not limited to roll-like ones, but may be belt-like ones.

The cooling roll 45 has a columnar geometry, and is configured as being freely rotatable around the center axis thereof assumed as the axis of rotation. The cooling roll 45 is configured as being coolable. More specifically, the cooling roll 45 has, inside thereof, one or more fluid passageways allowing a coolant to flow therethrough. The coolant adoptable herein may be water, for example. For example, the basic temperature is set to 115° C. using a pressurized hot water-type temperature regulator. The temperature regulator may be of oil type.

In thus-configured precision extrusion sheet forming machine 40, first, the resin material is melted by the extrusion machine 41, fed to the T-die 42 step by step, and then continuously ejected in a sheet form out from the T-die 42.

Next, the sheet ejected from the T-die 42 is nipped by the forming roll 43 and the elastic roll 44. By this process, the embossed pattern on the forming roll 43 is transferred onto the surface of sheet. Temperature of the forming roll 43 is kept in the range from Tg(° C.)+20° C. to Tg+45° C., wherein Tg is the glass transition temperature of the resin, and surface temperature of the elastic roll 44 is kept in a range from 20° C. to Tg. By keeping the surface temperature of the forming roll 43 and the elastic roll 44 in the above-described range, the embossed pattern may successfully be transferred onto the sheet. Temperature of the resin material in the process of transfer of the embossed pattern is preferably Tg+50° C. to Tg+230° C., and more preferably Tg+80° C. to Tg+200° C. By keeping the temperature of resin in the above-described range, the embossed pattern may successfully be transferred onto the sheet.

The sheet is then separated from the forming roll 43 with the aid of the cooling roll 45, while being nipped by the forming roll 43 and the cooling roll 45 so as to suppress flapping. The surface temperature of the cooling roll 45 in this process is kept in a temperature range not higher than Tg. By keeping the surface temperature of the cooling roll 45, and by nipping the sheet with the aid of the forming roll 43 and the cooling roll 45 so as to suppress flapping, the sheet may successfully be separated from the forming roll 43. Temperature of the resin material is preferably not lower than Tg, more preferably Tg+20° C. to Tg+85° C., and still more preferably Tg+30° C. to Tg+60° C. By keeping the temperature of resin in the above-described temperature range, and by nipping the sheet with the aid of the forming roll 43 and the cooling roll 45 so as to suppress flapping, the sheet may successfully be separated from the forming roll 43. By these processes, the lens sheet or prism sheet as a desired light-condensing sheet 14 may be obtained.

The light-condensing sheet 14 is formed using at least one species of transparent thermoplastic resin. The thermoplastic resin used herein preferably has a refractive index of 1.4 or larger, considering its function of controlling direction of emission of light. Examples of such resin include polycarbonate resin, acryl resin represented by polymethyl methacrylate resin, polyester resin represented by polyethylene terephthalate, amorphous polyester resin copolymer, polystyrene resin, and polyvinyl chloride. Considering the transferability of the lens pattern by the fusion extrusion molding, the resin preferably has a melt viscosity at around the molding temperature of 1,000 Pa or larger and 10,000 Pa or smaller.

The thermoplastic resin is preferably added with at least one species of mold releasing agent. By adding the mold releasing agent as described above, adhesiveness between the forming roll 43 and the sheet in the process of separating the sheet from the forming roll 43 may be adjusted, so as to prevent the light-condensing sheet 14 from getting separation lines. Amount of addition of the mold releasing agent preferably falls in a range from 0.02 wt % or more and 0.4 wt % or less of the thermoplastic resin. The content less than 0.02 wt % may degrade the mold releasing property, and the light-condensing sheet 14 may get the separation lines. On the other hand, the content exceeding 0.4 wt % may excessively enhance the mold releasing property, raising a nonconformity such that the sheet would be deformed before the transparent thermoplastic resin is solidified.

The thermoplastic resin is preferably added with at least one species of ultraviolet absorber or light stabilizer. By adding the ultraviolet absorber or light stabilizer in this way, changes in hue induced by light irradiated from the light source may be suppressed. Amount of addition of the ultraviolet absorber or the light stabilizer preferably falls in the range from 0.02 wt % or more and 0.4 wt % or less. The content less than 0.02 wt % may fail in suppressing changes in hue. On the other hand, the content exceeding 0.4 wt % may make the light-condensing sheet 14 yellowish.

Besides the above-described mold releasing agent, ultraviolet absorber and light stabilizer, it is also allowable to add additives such as antioxidant, anti-static agents, colorant, plasticizer, compatibilizer, and flame retardant. However, most of the additives may be causative of producing gas in the process of fusion extrusion under heating typically in the T-die 42, and may degrade film forming property and working environment, so that smaller total content of the additives may be more preferable, and the amount of addition may preferably be limited to 2 wt % with respect to the thermoplastic resin.

EXAMPLES

Paragraphs below will explain embodiments of the present invention, without limiting the present invention.

Example 1

As the light-condensing sheet, prism sheets having prism components having an isosceles triangular section arranged on the light-extraction surface thereof as the irregularities (pitch of arrangement P: 30 µm, 50 µm, 85 µm, 110 µm, 160 µm, 200 µm, 300 µm) were manufactured, by fusion extrusion molding using a polycarbonate resin. Next, each of these prism sheets was bonded to a flat transparent polycarbonate sheet using an acryl-base, pressure-sensitive adhesive to thereby configure optical sheet stacks, and the stacks were punched to produce samples. For each sample, the front luminance was measured, and presence or absence of deflection was confirmed.

Alternatively, as the light-condensing sheet, lenticular lens sheets having lens components having hyperboloid geometries expressed by the equations below arranged on the light-extraction surface thereof as the irregularities (pitch of arrangement P: 30 µm, 50 µm, 85 µm, 110 µm, 160 µm, 200 µm, 300 µm) were manufactured, by fusion extrusion molding using a polycarbonate resin. Next, each of these lenticular lens sheets is bonded to the above-described transparent sheet using an acryl-base, pressure-sensitive adhesive to thereby configure optical sheet stacks, and the stacks were punched to produce samples. For each sample, the front luminance was measured, and presence or absence of deflection was confirmed.

The lens components composing the lenticular lens sheets were designed as expressed below, with reference to lens geometry of 50-µm pitch:

P: 30 µm $$Z=0.6(X/0.6)^2/(5+\sqrt{(25+(X/0.6)^2)})$$

P: 50 µm $$Z=X^2/(5+\sqrt{(25+X^2)})$$

P: 85 µm $$Z=1.7(X/1.7)^2/(5+\sqrt{(25+(X/1.7)^2)})$$

P: 110 µm $$Z=2.2(X/2.2)^2/(5+\sqrt{(25+(X/2.2)^2)})$$

P: 160 µm $$Z=3.2(X/3.2)^2/(5+\sqrt{(25+(X/3.2)^2)})$$

P: 200 µm $$Z=4(X/4)^2/(5+\sqrt{(25+(X/4)^2)})$$

P: 300 µm $$Z=6(X/6)^2/(5+\sqrt{(25+(X/6)^2)})$$

Results of measurement are shown in Table 1. In Table 1, samples 1 (1-1 to 1-8) and samples 2 (2-1 to 2-7) show results of measurement made on the prism sheets, and samples 3 (3-1 to 3-7) and samples 4 (4-1 to 4-7) show results of measurement made on the hyperboloidal lenticular lens sheets. The width of bonding Pw to the adhesive layer is 6 µm for sample 1, 10 µm for sample 2, 13 µm for sample 3, and 17 µm for sample 4.

TABLE 1

| | Geometry of Irregularity | Pitch of Arrangement (P) (μm) | Pw/P (—) | Measured Front Luminance (%) | Occurrence of Deflection |
|---|---|---|---|---|---|
| Sample 1-1 | prism | 30 | 0.2 | 87 | NO |
| Sample 1-2 | | 50 | 0.12 | 92 | NO |
| Sample 1-3 | | 85 | 0.071 | 95 | NO |
| Sample 1-4 | | 110 | 0.055 | 98 | NO |
| Sample 1-5 | | 160 | 0.038 | 99 | NO |
| Sample 1-6 | | 200 | 0.03 | 99 | NO |
| Sample 1-7 | | 300 | 0.02 | 99 | NO |
| Sample 1-8 | | 50 | 0 | 100 | YES |
| Sample 2-1 | prism | 30 | 0.33 | 80 | NO |
| Sample 2-2 | | 50 | 0.2 | 88 | NO |
| Sample 2-3 | | 85 | 0.118 | 93 | NO |
| Sample 2-4 | | 110 | 0.09 | 95 | NO |
| Sample 2-5 | | 160 | 0.063 | 97 | NO |
| Sample 2-6 | | 200 | 0.05 | 97 | NO |
| Sample 2-7 | | 300 | 0.033 | 97 | NO |
| Sample 3-1 | hyperboloid | 30 | 0.433 | 79 | NO |
| Sample 3-2 | | 50 | 0.26 | 88 | NO |
| Sample 3-3 | | 85 | 0.153 | 95 | NO |
| Sample 3-4 | | 110 | 0.118 | 97 | NO |
| Sample 3-5 | | 160 | 0.081 | 99 | NO |
| Sample 3-6 | | 200 | 0.065 | 100 | NO |
| Sample 3-7 | | 300 | 0.043 | 101 | NO |
| Sample 4-1 | hyperboloid | 30 | 0.567 | 74 | NO |
| Sample 4-2 | | 50 | 0.34 | 83 | NO |
| Sample 4-3 | | 85 | 0.2 | 89 | NO |
| Sample 4-4 | | 110 | 0.155 | 95 | NO |
| Sample 4-5 | | 160 | 0.106 | 97 | NO |
| Sample 4-6 | | 200 | 0.085 | 98 | NO |
| Sample 4-7 | | 300 | 0.057 | 99 | NO |

Measurement values of front luminance were expressed as relative values with respect to the measurement value of front luminance of an optical sheet stack (sample 1-8) having a 50-μm-pitch prism sheet simply stacked on the transparent sheet without placing the adhesive layer in between. Presence or absence of the deflection was indicated by "NO" meaning deflection not observed, and "YES" meaning deflection observed.

It is known from Table 1 that all samples having large ratios (Pw/P) of the width of bonding Pw to the pitch of arrangement P were lowered in the front luminance, even if the irregularities thereof have the same geometries (prism, hyperboloid). This is because the function of condensing light at the irregularities lowers as the Pw/P increases. Of these, the samples of Pw/P>0.2 are generally large in ratio of decrease in luminance, in particular, sample 2-1 and sample 4-2 showed the ratios of decrease in luminance of as much as 20% or around, and sample 3-1 and sample 4-1 showed the ratios of decrease in luminance exceeding 20%.

In contrast, the samples of Pw/P≦0.2 were generally low in the ratio of decrease in luminance, and it was confirmed that those of Pw/P<0.2 in particular showed the ratio of decrease in luminance of 10% or less, and those of Pw/P≦1.6 successfully suppressed the ratio of decrease in luminance to as small as 5% or less. The front luminance of equivalent to or superior to the reference value was obtained for sample 3-6 and sample 3-7. Deflection was observed in none of the samples except sample 1-8.

As described in the above, according to the optical sheet stack of the present invention manufactured under the condition of Pw/P≦0.2, deflection may be avoidable, and decrease in the front luminance may be minimized.

Example 2

A plurality of diffuser sheets differing in diffusion characteristics were obtained, each of these diffuser sheets was combined with a light-condensing sheet having a predetermined irregularities pitch of arrangement to thereby configure a liquid crystal display device. For each sample, the front luminance was measured, and presence or absence of moire was checked. The light-condensing sheet herein was disposed so as to align the direction of ridgeline of the prism components or the lens components to the horizontal direction of the screen. A reflection-type, polarized-light separation element ("DBEFD" (trade name) available from 3M), having a diffusion functional layer, was also used as one species of the diffuser sheet.

Table 2 shows diffusion characteristics of the obtained diffuser sheets, including haze (H), total transmissivity of light (Tt), diffused light (Td), linear transmission (Tp), and "H/Tt"0.0

TABLE 2

(Measured Values of Back Scattering)

|  | Haze H (%) | Total Transmissivity of Light Tt (%) | Diffused Light Td (%) | Linear Transmission Tp (%) | H/Tt |
|---|---|---|---|---|---|
| Diffuser Sheet 1 | 99.7 | 35.4 | 35.3 | 0.1 | 2.82 |
| Diffuser Sheet 2 | 91 | 66.1 | 60.2 | 5.9 | 1.38 |
| Diffuser Sheet 3 | 95.2 | 71.1 | 67.6 | 3.5 | 1.34 |
| Diffuser Sheet 4 | 74.6 | 59.4 | 44.3 | 15.1 | 1.26 |
| Diffuser Sheet 5 | 83.7 | 90.7 | 75.9 | 14.8 | 0.92 |
| Diffuser Sheet 6 | 60.1 | 90 | 54.1 | 35.9 | 0.67 |
| Diffuser Sheet 7 | 33.6 | 89.8 | 30.2 | 59.6 | 0.37 |
| DBEFD | 82.2 | 47.2 | 38.8 | 8.4 | 1.74 |

Haze (H) of the diffuser sheets were measured using a hazemeter HM-150 from Murakami Color Research Laboratory Co., Ltd. Of the transmitted light coming through the test pieces, percentage of those deviated from the incident light by 20 back scattering (surface of diffusion on the light-emission side) was measured. The haze was measured using a mode of measurement conforming to JIS-K-7136, available in the above-described hazemeter. Also total transmissivity of light (Tt), linear transmission (Tp), and diffused light (Td), described later, were also measured on the basis of back scattering similarly to as in the haze measurement.

The total transmissivity of light (Tt) of the diffuser sheet was measured using the hazemeter HM-150 from Murakami Color Research Laboratory Co., Ltd. Of the transmitted light coming through the test pieces, ratio of flux of light of parallel incidence to the total flux of transmitted light was measured (conforming to JIS-K-7361).

The linear transmission (Tp) was measured using the hazemeter HM-150 from Murakami Color Research Laboratory Co., Ltd. Of the transmitted light coming through the test pieces, percentage of those fallen in a range of deviation from the parallel flux of incident light of smaller than 2.5° was measured (conforming to the method of measuring haze specified in JIS-K-7136).

The diffused light (Td) was expressed by transmissivity determined by subtracting linear transmissivity of linear component from the total transmissivity of light measured using the hazemeter HM-150 from Murakami Color Research Laboratory Co., Ltd.

As the light-condensing sheet, the individual lenticular lens sheets having the irregularities of hyperboloidal geometries (pitch of arrangement P: 30 μm, 50 μm, 85 μm, 110 μm, 160 μm, 200 μm, 300 μm) used in Example 1 in the above were used.

Each of these lenticular lens sheets was combined with each of the diffuser sheets 1 to 7 having diffusion characteristics shown in Table 2, and a liquid crystal display panel having a pixel pitch Pp of 320 μm, to thereby configure a liquid crystal display device. Values of "(H/Tt)·(Pp/P)", results of evaluation of moire generation, measured values of front luminance, and results of evaluation of deflection after mounting observed for the liquid crystal display devices having the individual configurations were shown in Table 3.

TABLE 3

|  |  | Geometry of Irregularity | Diffuser Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| 320 | Sample 5-1 | hyperboloid | 1 | 0.56 | 30 | 10.67 | 30.05 | NO | 40 | NO |
|  | Sample 5-2 |  | 2 |  |  |  | 14.69 | NO | 80 | NO |
|  | Sample 5-3 |  | 3 |  |  |  | 14.29 | NO | 79 | NO |
|  | Sample 5-4 |  | 4 |  |  |  | 13.40 | NO | 82 | NO |
|  | Sample 5-5 |  | 5 |  |  |  | 9.85 | NO | 81 | NO |
|  | Sample 5-6 |  | 6 |  |  |  | 7.13 | NO | 79 | NO |
|  | Sample 5-7 |  | 7 |  |  |  | 3.99 | NO | 80 | NO |
|  | Sample 6-1 | hyperboloid | 1 | 0.34 | 50 | 6.4 | 18.02 | NO | 41 | NO |
|  | Sample 6-2 |  | 2 |  |  |  | 8.81 | NO | 88 | NO |
|  | Sample 6-3 |  | 3 |  |  |  | 8.57 | NO | 88 | NO |
|  | Sample 6-4 |  | 4 |  |  |  | 8.04 | NO | 90 | NO |
|  | Sample 6-5 |  | 5 |  |  |  | 5.91 | NO | 89 | NO |
|  | Sample 6-6 |  | 6 |  |  |  | 4.27 | NO | 88 | NO |
|  | Sample 6-7 |  | 7 |  |  |  | 2.39 | NO | 87 | NO |
|  | Sample 7-1 | hyperboloid | 1 | 0.2 | 85 | 3.76 | 10.59 | NO | 42 | NO |
|  | Sample 7-2 |  | 2 |  |  |  | 5.18 | NO | 94 | NO |
|  | Sample 7-3 |  | 3 |  |  |  | 5.03 | NO | 95 | NO |
|  | Sample 7-4 |  | 4 |  |  |  | 4.72 | NO | 96 | NO |
|  | Sample 7-5 |  | 5 |  |  |  | 3.47 | NO | 94 | NO |
|  | Sample 7-6 |  | 6 |  |  |  | 2.51 | NO | 93 | NO |
|  | Sample 7-7 |  | 7 |  |  |  | 1.41 | YES | 92 | NO |
|  | Sample 8-1 | hyperboloid | 1 | 0.155 | 110 | 2.9 | 8.17 | NO | 48 | NO |
|  | Sample 8-2 |  | 2 |  |  |  | 3.99 | NO | 98 | NO |
|  | Sample 8-3 |  | 3 |  |  |  | 3.88 | NO | 97 | NO |
|  | Sample 8-4 |  | 4 |  |  |  | 3.64 | NO | 99 | NO |
|  | Sample 8-5 |  | 5 |  |  |  | 2.68 | NO | 99 | NO |
|  | Sample 8-6 |  | 6 |  |  |  | 1.94 | NO | 97 | NO |
|  | Sample 8-7 |  | 7 |  |  |  | 1.09 | YES | 95 | NO |

TABLE 3-continued

|  | Geometry of Irregularity | Diffuser Sheet Type | Pw/P (—) | P (μm) | Pp/P (—) | (H/T) * (Pp/P) | Moire | Front Luminance Value (%) | Deflection |
|---|---|---|---|---|---|---|---|---|---|
| Sample 9-1 | hyperboloid | 1 | 0.106 | 160 | 2 | 5.63 | NO | 53 | NO |
| Sample 9-2 |  | 2 |  |  |  | 2.75 | NO | 98 | NO |
| Sample 9-3 |  | 3 |  |  |  | 2.68 | NO | 99 | NO |
| Sample 9-4 |  | 4 |  |  |  | 2.51 | NO | 100 | NO |
| Sample 9-5 |  | 5 |  |  |  | 1.85 | NO | 99 | NO |
| Sample 9-6 |  | 6 |  |  |  | 1.34 | YES | 98 | NO |
| Sample 9-7 |  | 7 |  |  |  | 0.75 | YES | 96 | NO |
| Sample 10-1 | hyperboloid | 1 | 0.085 | 200 | 1.6 | 4.51 | NO | 54 | NO |
| Sample 10-2 |  | 2 |  |  |  | 2.20 | NO | 99 | NO |
| Sample 10-3 |  | 3 |  |  |  | 2.14 | NO | 100 | NO |
| Sample 10-4 |  | 4 |  |  |  | 2.01 | NO | 101 | NO |
| Sample 10-5 |  | 5 |  |  |  | 1.48 | YES | 99 | NO |
| Sample 10-6 |  | 6 |  |  |  | 1.07 | YES | 98 | NO |
| Sample 10-7 |  | 7 |  |  |  | 0.60 | YES | 97 | NO |
| Sample 11-1 | hyperboloid | 1 | 0.057 | 300 | 1.07 | 3.01 | NO | 54 | NO |
| Sample 11-2 |  | 2 |  |  |  | 1.47 | YES | 100 | NO |
| Sample 11-3 |  | 3 |  |  |  | 1.43 | YES | 101 | NO |
| Sample 11-4 |  | 4 |  |  |  | 1.34 | YES | 103 | NO |
| Sample 11-5 |  | 5 |  |  |  | 0.99 | YES | 99 | NO |
| Sample 11-6 |  | 6 |  |  |  | 0.71 | YES | 100 | NO |
| Sample 11-7 |  | 7 |  |  |  | 0.40 | YES | 98 | NO |

The moire generation was evaluated as follows (the same will apply also to Examples 3 to 6).

In a dark room, a video signal for white state was input to each of thus-configured liquid crystal display devices, and states of generation of moire were visually observed from the front and from oblique directions. In the column for evaluation of moire, "NO" indicates the case of causing no moire, and "YES" indicates the case of causing the moire.

The front luminance was measured as follows (the same will apply also to Examples 3 to 6).

In a dark room, a video signal for white state was input to each of thus-configured liquid crystal display devices, each device was kept illuminated for 2 hours, and the luminance was measured by a spectroradiometer "CS-1000" from Konica Minolta Holdings, Inc. set 500 mm away from the surface of the panel. The measurement was repeated three times, and an average value thereof was adopted as a measured value.

The deflection of the optical sheet after being mounted to the panel was evaluated as follows (the same will apply also to Examples 3 to 6).

In a dark room, a video signal for white state was input to each of thus-configured liquid crystal display devices, each device was kept illuminated for 1 hour, and the state of non-uniformity in the luminance was visually observed in the direction approximately 60° inclined away from the front of the panel, and was evaluated as the deflection of the sheet.

Judgment
NO: no deflection
SOME: some deflection
YES: apparent deflection

The measurement values of the front luminance were expressed as relative values with respect to the measurement values of front luminance of a liquid crystal display device configured by combining a prism sheet "BEFIII" available from 3M as the light-condensing sheet, the "diffuser sheet 2" shown in Table 2, and a liquid crystal display panel having the same pixel pitch (320 μm in this Example). Luminance characteristic of the above-described "BEFIII" corresponds to a plot in FIG. 7 for "PRISM GEOMETRY+DIFFUSER SHEET STACKED".

As shown in Table 3, for the case where the liquid crystal display panel has a pixel pitch of 320 μm, no moire was observed for the liquid crystal display devices using, as the light-condensing sheet, the hyperboloidal lenticular lens sheets having pitches of arrangement P of the irregularities of 30 μm and 50 μm.

For the case where the irregularities have a pitch of arrangement P of 85 μm or 110 μm, the moire was observed in samples (7-7, 8-7) using the "diffuser sheet 7". For the case where the pitch of arrangement P is 160 μm, the moire was observed in samples (9-6, 9-7) using the "diffuser sheets 6, 7". Similarly for the case where the pitch of arrangement P is 200 μm, the moire was observed in samples ($10^{-5}$ to $10^{-7}$) using the "diffuser sheets 5, 6, 7". For the case where the pitch of arrangement P is 300 μm, only sample (11-1) using "diffuser sheet 1" showed no moire.

It is known from Table 3 that, in the liquid crystal display device having a liquid crystal display panel having a pixel pitch of 320 μm, the moire is more likely to occur as the pitch of arrangement P of the irregularities of the light-condensing sheet becomes larger, in which a combination of the diffuser sheet and the light-condensing sheet capable of adjusting the value of "(H/Tt)·(Pp/P)" to 1.7 or larger may successfully suppress the moire generation.

On the other hand, it is understood that better front luminance characteristics may be obtained as values of the pitch of arrangement P of the irregularities become larger. This is supposedly because widening of the pitch of arrangement P expands the regions of irregular surfaces, thereby the condensing characteristics (or lens characteristics) may be improved, the light-condensing characteristics may be improved, and the front luminance may be improved. However, samples 5, 6 having values of Pw/P exceeding 0.2 showed decrease in the front luminance by 10% or more from the reference value, and failed in suppressing decrease in the luminance.

No deflection was found to occur in the process of mounting. This is supposedly because bonding of the light-condensing sheet and the diffuser sheet improves the rigidity as compared with the case where the individual sheets are used independently, so that deformation due to heat from the backlight may become less likely to occur.

Example 3

As the light-condensing sheet, the individual lenticular lens sheets having the irregularities of hyperboloidal geometries (pitch of arrangement P: 30 μm, 50 μm, 85 μm, 110 μm, 160 μm, 200 μm, 300 μm) used in Example 1 in the above were used.

Each of these lenticular lens sheets was combined with each of the diffuser sheets 1 to 7 having diffusion characteristics shown in Table 2, and a liquid crystal display panel having a pixel pitch Pp of 510 μm, to thereby configure a liquid crystal display device. Measurement of "(H/Tt)·(Pp/P)", evaluation of moire generation, measurement of front luminance, and evaluation of deflection after mounting were carried out for each of thus-configured liquid crystal display devices, similarly to as described in Example 2. Results are shown in Table 4.

light-condensing sheet, the hyperboloidal lenticular lens sheets having pitches of arrangement P of the irregularities of 30 μm, 50 μm, 85 μm and 110 μm.

For the case where the irregularities have a pitch of arrangement P of 160 μm or 200 μm, the moire was observed in samples (16-7, 17-7) using the "diffuser sheet 7". For the case where the pitch of arrangement P is 300 μm, the moire was observed in samples (18-5 to 18-7) using the "diffuser sheets 5, 6, 7".

It is known from Table 4 that, in the liquid crystal display device having a liquid crystal display panel having a pixel pitch of 510 μm, the moire is more likely to occur as the pitch of arrangement of the irregularities of the light-condensing sheet becomes larger, in which a combination of the diffuser sheet and the light-condensing sheet capable of adjusting the value of "(H/Tt)·(Pp/P)" to 1.7 or larger may successfully suppress the moire generation.

TABLE 4

| | | Geometry of Irregularity | Diffuser Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| 510 | Sample 12-1 | hyperboloid | 1 | 0.56 | 30 | 17 | 47.88 | NO | 41 | NO |
| | Sample 12-2 | | 2 | | | | 23.40 | NO | 82 | NO |
| | Sample 12-3 | | 3 | | | | 22.76 | NO | 81 | NO |
| | Sample 12-4 | | 4 | | | | 21.35 | NO | 80 | NO |
| | Sample 12-5 | | 5 | | | | 15.69 | NO | 81 | NO |
| | Sample 12-6 | | 6 | | | | 11.35 | NO | 80 | NO |
| | Sample 12-7 | | 7 | | | | 6.36 | NO | 81 | NO |
| | Sample 13-2 | hyperboloid | 1 | 0.34 | 50 | 10.2 | 28.73 | NO | 42 | NO |
| | Sample 13-3 | | 2 | | | | 14.04 | NO | 89 | NO |
| | Sample 13-4 | | 3 | | | | 13.66 | NO | 80 | NO |
| | Sample 13-5 | | 4 | | | | 12.81 | NO | 92 | NO |
| | Sample 13-6 | | 5 | | | | 9.41 | NO | 90 | NO |
| | Sample 13-7 | | 6 | | | | 6.81 | NO | 90 | NO |
| | Sample 13-8 | | 7 | | | | 3.82 | NO | 89 | NO |
| | Sample 14-1 | hyperboloid | 1 | 0.2 | 85 | 6 | 16.90 | NO | 43 | NO |
| | Sample 14-2 | | 2 | | | | 8.26 | NO | 94 | NO |
| | Sample 14-3 | | 3 | | | | 8.03 | NO | 94 | NO |
| | Sample 14-4 | | 4 | | | | 7.54 | NO | 95 | NO |
| | Sample 14-5 | | 5 | | | | 5.54 | NO | 94 | NO |
| | Sample 14-6 | | 6 | | | | 4.01 | NO | 93 | NO |
| | Sample 14-7 | | 7 | | | | 2.24 | NO | 92 | NO |
| | Sample 15-1 | hyperboloid | 1 | 0.155 | 110 | 4.64 | 31.07 | NO | 47 | NO |
| | Sample 15-2 | | 2 | | | | 6.39 | NO | 98 | NO |
| | Sample 15-3 | | 3 | | | | 6.21 | NO | 98 | NO |
| | Sample 15-4 | | 4 | | | | 5.83 | NO | 100 | NO |
| | Sample 15-5 | | 5 | | | | 4.28 | NO | 100 | NO |
| | Sample 15-6 | | 6 | | | | 3.10 | NO | 99 | NO |
| | Sample 15-7 | | 7 | | | | 1.74 | NO | 98 | NO |
| | Sample 16-1 | hyperboloid | 1 | 0.106 | 160 | 3.19 | 8.98 | NO | 53 | NO |
| | Sample 16-2 | | 2 | | | | 4.39 | NO | 98 | NO |
| | Sample 16-3 | | 3 | | | | 4.27 | NO | 100 | NO |
| | Sample 16-4 | | 4 | | | | 4.01 | NO | 101 | NO |
| | Sample 16-5 | | 5 | | | | 2.94 | NO | 100 | NO |
| | Sample 16-6 | | 6 | | | | 2.13 | NO | 99 | NO |
| | Sample 16-7 | | 7 | | | | 1.19 | YES | 98 | NO |
| | Sample 17-1 | hyperboloid | 1 | 0.085 | 200 | 2.55 | 7.18 | NO | 54 | NO |
| | Sample 17-2 | | 2 | | | | 3.51 | NO | 100 | NO |
| | Sample 17-3 | | 3 | | | | 3.41 | NO | 101 | NO |
| | Sample 17-4 | | 4 | | | | 3.20 | NO | 102 | NO |
| | Sample 17-5 | | 5 | | | | 2.35 | NO | 100 | NO |
| | Sample 17-6 | | 6 | | | | 1.70 | NO | 99 | NO |
| | Sample 17-7 | | 7 | | | | 0.95 | YES | 98 | NO |
| | Sample 18-1 | hyperboloid | 1 | 0.057 | 300 | 1.7 | 4.79 | NO | 55 | NO |
| | Sample 18-2 | | 2 | | | | 2.34 | NO | 101 | NO |
| | Sample 18-3 | | 3 | | | | 2.28 | NO | 102 | NO |
| | Sample 18-4 | | 4 | | | | 2.14 | NO | 103 | NO |
| | Sample 18-5 | | 5 | | | | 1.57 | YES | 101 | NO |
| | Sample 18-6 | | 6 | | | | 1.14 | YES | 102 | NO |
| | Sample 18-7 | | 7 | | | | 0.64 | YES | 100 | NO |

As shown in Table 4, for the case where the liquid crystal display panel has a pixel pitch of 510 μm, no moire was observed for the liquid crystal display devices using, as the On the other hand, it is understood that better front luminance characteristics may be obtained as values of the pitch of arrangement P of the irregularities become larger. This is supposedly because widening of the pitch of arrangement P expands the regions of irregular surfaces, thereby the condensing characteristics (or lens characteristics) may be improved, the light-condensing characteristics may be improved, and the front luminance may be improved. However, samples 12, 13 having values of Pw/P exceeding 0.2 showed decrease in the front luminance by 10% or more from the reference value, and failed in suppressing decrease in the luminance.

No deflection was found to occur in the process of mounting. This is supposedly because bonding of the light-condensing sheet and the diffuser sheet improves the rigidity as compared with the case where the individual sheets are used independently, so that deformation due to heat from the backlight may become less likely to occur.

Example 4

As the light-condensing sheet, prism sheets having prism components having an isosceles triangular section arranged on the light-extraction surface thereof (pitch of arrangement P: 30 μm, 50 μm, 85 μm, 110 μm, 160 μm, 200 μm, 300 μm) were manufactured, by fusion extrusion molding using a polycarbonate resin. Each of these prism sheets was bonded with the various diffuser sheets having diffusion characteristics shown in Table 2, using an acryl-base, pressure-sensitive adhesive to thereby configure optical sheet stacks, and each stack was combined with a liquid crystal display panel having a pixel pitch Pp of 320 μm, to thereby configure a liquid crystal display device. Measurement of "(H/Tt)·(Pp/P)", evaluation of moire generation, measurement of front luminance, and evaluation of deflection after mounting were carried out for each of thus-configured liquid crystal display devices, similarly to as described in Example 2. Results are shown in Table 4.

TABLE 5

| | | Geometry of Irregularity | Diffusion Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| 320 | Sample 19-1 | prism | 1 | 0.33 | 30 | 10.67 | 30.05 | NO | 45 | NO |
| | Sample 19-2 | | 2 | | | | 14.69 | NO | 88 | NO |
| | Sample 19-3 | | 3 | | | | 14.29 | NO | 87 | NO |
| | Sample 19-4 | | 4 | | | | 13.40 | NO | 90 | NO |
| | Sample 19-5 | | 5 | | | | 9.85 | NO | 89 | NO |
| | Sample 19-6 | | 6 | | | | 7.13 | NO | 87 | NO |
| | Sample 19-7 | | 7 | | | | 3.99 | NO | 88 | NO |
| 320 | Sample 20-1 | prism | 1 | 0.2 | 50 | 6.4 | 18.02 | NO | 47 | NO |
| | Sample 20-2 | | 2 | | | | 8.81 | NO | 93 | NO |
| | Sample 20-3 | | 3 | | | | 8.57 | NO | 92 | NO |
| | Sample 20-4 | | 4 | | | | 8.04 | NO | 94 | NO |
| | Sample 20-5 | | 5 | | | | 5.91 | NO | 93 | NO |
| | Sample 20-6 | | 6 | | | | 4.27 | NO | 92 | NO |
| | Sample 20-7 | | 7 | | | | 2.39 | NO | 91 | NO |
| 320 | Sample 21-1 | prism | 1 | 0.12 | 85 | 3.76 | 10.59 | NO | 48 | NO |
| | Sample 21-2 | | 2 | | | | 5.18 | NO | 95 | NO |
| | Sample 21-3 | | 3 | | | | 5.03 | NO | 95 | NO |
| | Sample 21-4 | | 4 | | | | 4.72 | NO | 97 | NO |
| | Sample 21-5 | | 5 | | | | 3.47 | NO | 94 | NO |
| | Sample 21-6 | | 6 | | | | 2.51 | NO | 93 | NO |
| | Sample 21-7 | | 7 | | | | 1.41 | YES | 92 | NO |
| 320 | Sample 22-1 | prism | 1 | 0.09 | 110 | 2.9 | 8.17 | NO | 50 | NO |
| | Sample 22-2 | | 2 | | | | 3.99 | NO | 98 | NO |
| | Sample 22-3 | | 3 | | | | 3.88 | NO | 98 | NO |
| | Sample 22-4 | | 4 | | | | 3.64 | NO | 100 | NO |
| | Sample 22-5 | | 5 | | | | 2.68 | NO | 98 | NO |
| | Sample 22-6 | | 6 | | | | 1.94 | NO | 96 | NO |
| | Sample 22-7 | | 7 | | | | 1.09 | YES | 94 | NO |
| 320 | Sample 23-1 | prism | 1 | 0.063 | 160 | 2 | 5.63 | NO | 52 | NO |
| | Sample 23-2 | | 2 | | | | 2.75 | NO | 98 | NO |
| | Sample 23-3 | | 3 | | | | 2.68 | NO | 99 | NO |
| | Sample 23-4 | | 4 | | | | 2.51 | NO | 101 | NO |
| | Sample 23-5 | | 5 | | | | 1.85 | NO | 98 | NO |
| | Sample 23-6 | | 6 | | | | 1.34 | YES | 97 | NO |
| | Sample 23-7 | | 7 | | | | 0.75 | YES | 95 | NO |
| 320 | Sample 24-1 | prism | 1 | 0.05 | 200 | 1.6 | 4.51 | NO | 53 | NO |
| | Sample 24-2 | | 2 | | | | 2.20 | NO | 98 | NO |
| | Sample 24-3 | | 3 | | | | 2.14 | NO | 99 | NO |
| | Sample 24-4 | | 4 | | | | 2.01 | NO | 101 | NO |
| | Sample 24-5 | | 5 | | | | 1.48 | YES | 99 | NO |
| | Sample 24-6 | | 6 | | | | 1.07 | YES | 98 | NO |
| | Sample 24-7 | | 7 | | | | 0.60 | YES | 96 | NO |
| 320 | Sample 25-1 | prism | 1 | 0.03 | 300 | 1.07 | 3.01 | NO | 54 | NO |
| | Sample 25-2 | | 2 | | | | 1.47 | YES | 99 | NO |
| | Sample 25-3 | | 3 | | | | 1.43 | YES | 100 | NO |
| | Sample 25-4 | | 4 | | | | 1.34 | YES | 102 | NO |
| | Sample 25-5 | | 5 | | | | 0.99 | YES | 100 | NO |
| | Sample 25-6 | | 6 | | | | 0.71 | YES | 99 | NO |
| | Sample 25-7 | | 7 | | | | 0.40 | YES | 97 | NO |

As shown in Table 5, for the case where the liquid crystal display panel has a pixel pitch of 320 μm, no moire was observed for the liquid crystal display devices using, as the light-condensing sheet, the prism sheets having pitches of arrangement P of the irregularities of 30 μm and 50 μm.

For the case where the irregularities have a pitch of arrangement P of 85 μm or 110 μm, the moire was observed in samples (21-7, 22-7) using the "diffuser sheet 7". For the case where the pitch of arrangement P is 160 μm, the moire was observed in samples (23-6, 23-7) using the "diffuser sheets 6, 7". Similarly for the case where the pitch of arrangement P is 200 μm, the moire was observed in samples (24-5 to 24-7) using the "diffuser sheets 5, 6, 7". For the case where the pitch of arrangement P is 300 μm, only sample (25-1) using "diffuser sheet 1" showed no moire.

It is known from Table 5 that, in the liquid crystal display device having a liquid crystal display panel having a pixel pitch of 320 μm, the moire is more likely to occur as the pitch of arrangement of the irregularities of the light-condensing sheet becomes larger, in which a combination of the diffuser sheet and the light-condensing sheet capable of adjusting the value of "(H/Tt)·(Pp/P)" to 1.7 or larger may successfully suppress the moire generation.

On the other hand, it is understood that better front luminance characteristics may be obtained as values of the pitch of arrangement P of the irregularities become larger. This is supposedly because widening of the pitch of arrangement P expands the regions of irregular surfaces, thereby the condensing characteristics (or lens characteristics) may be improved, the light-condensing characteristics may be improved, and the front luminance may be improved. However, sample 19 having a value of Pw/P exceeding 0.2 showed decrease in the front luminance by 10% or more from the reference value, and failed in suppressing decrease in the luminance.

No deflection was found to occur in the process of mounting. This is supposedly because bonding of the light-condensing sheet and the diffuser sheet improves the rigidity as compared with the case where the individual sheets are used independently, so that deformation due to heat from the backlight may become less likely to occur.

Example 5

As the light-condensing sheet, prism sheets having prism components having an isosceles triangular section arranged on the light-extraction surface thereof (pitch of arrangement P: 30 μm, 50 μm, 85 μm, 110 μm, 160 μm, 200 μm, 300 μm) were manufactured, by fusion extrusion molding using a polycarbonate resin. Each of these prism sheets was bonded with the various diffuser sheets having diffusion characteristics shown in Table 2, using an acryl-base, pressure-sensitive adhesive to thereby configure optical sheet stacks, and each stack was combined with a liquid crystal display panel having a pixel pitch Pp of 510 μm, to thereby configure a liquid crystal display device. Measurement of "(H/Tt)·(Pp/P)", evaluation of moire generation, measurement of front luminance, and evaluation of deflection after mounting were carried out for each of thus-configured liquid crystal display devices, similarly to as described in Example 2. Results are shown in Table 6.

TABLE 6

| | | Geometry of Irregularity | Diffusion Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| 510 | Sample 26-1 | prism | 1 | 0.33 | 30 | 17 | 47.88 | NO | 46 | NO |
| | Sample 26-2 | | 2 | | | | 23.40 | NO | 87 | NO |
| | Sample 26-3 | | 3 | | | | 22.76 | NO | 86 | NO |
| | Sample 26-4 | | 4 | | | | 21.35 | NO | 89 | NO |
| | Sample 26-5 | | 5 | | | | 15.69 | NO | 90 | NO |
| | Sample 26-6 | | 6 | | | | 11.35 | NO | 88 | NO |
| | Sample 26-7 | | 7 | | | | 6.36 | NO | 88 | NO |
| | Sample 27-1 | prism | 1 | 0.2 | 50 | 10.2 | 28.73 | NO | 47 | NO |
| | Sample 27-2 | | 2 | | | | 14.04 | NO | 92 | NO |
| | Sample 27-3 | | 3 | | | | 13.66 | NO | 92 | NO |
| | Sample 27-4 | | 4 | | | | 12.81 | NO | 94 | NO |
| | Sample 27-5 | | 5 | | | | 9.41 | NO | 93 | NO |
| | Sample 27-6 | | 6 | | | | 6.81 | NO | 93 | NO |
| | Sample 27-7 | | 7 | | | | 3.82 | NO | 92 | NO |
| | Sample 28-1 | prism | 1 | 0.12 | 85 | 6 | 16.90 | NO | 48 | NO |
| | Sample 28-2 | | 2 | | | | 8.26 | NO | 96 | NO |
| | Sample 28-3 | | 3 | | | | 8.03 | NO | 95 | NO |
| | Sample 28-4 | | 4 | | | | 7.54 | NO | 96 | NO |
| | Sample 28-5 | | 5 | | | | 5.54 | NO | 95 | NO |
| | Sample 28-6 | | 6 | | | | 4.01 | NO | 94 | NO |
| | Sample 28-7 | | 7 | | | | 2.24 | NO | 91 | NO |
| | Sample 29-1 | prism | 1 | 0.09 | 110 | 4.64 | 13.07 | NO | 51 | NO |
| | Sample 29-2 | | 2 | | | | 6.39 | NO | 99 | NO |
| | Sample 29-3 | | 3 | | | | 6.21 | NO | 98 | NO |
| | Sample 29-4 | | 4 | | | | 5.83 | NO | 101 | NO |
| | Sample 29-5 | | 5 | | | | 4.28 | NO | 99 | NO |
| | Sample 29-6 | | 6 | | | | 3.10 | NO | 97 | NO |
| | Sample 29-7 | | 7 | | | | 1.74 | NO | 95 | NO |
| | Sample 30-1 | prism | 1 | 0.063 | 160 | 3.19 | 8.98 | NO | 51 | NO |
| | Sample 30-2 | | 2 | | | | 4.39 | NO | 97 | NO |
| | Sample 30-3 | | 3 | | | | 4.27 | NO | 99 | NO |
| | Sample 30-4 | | 4 | | | | 4.01 | NO | 101 | NO |
| | Sample 30-5 | | 5 | | | | 2.94 | NO | 97 | NO |
| | Sample 30-6 | | 6 | | | | 2.13 | NO | 96 | NO |
| | Sample 30-7 | | 7 | | | | 1.19 | YES | 96 | NO |
| | Sample 31-1 | prism | 1 | 0.05 | 200 | 2.55 | 7.18 | NO | 52 | NO |
| | Sample 31-2 | | 2 | | | | 3.51 | NO | 97 | NO |

TABLE 6-continued

|  | Geometry of Irregularity | Diffusion Sheet Type | Pw/P (—) | P (μm) | Pp/P (—) | (H/T) * (Pp/P) | Moire | Front Luminance Value (%) | Deflection |
|---|---|---|---|---|---|---|---|---|---|
| Sample 31-3 |  | 3 |  |  |  | 3.41 | NO | 99 | NO |
| Sample 31-4 |  | 4 |  |  |  | 3.20 | NO | 100 | NO |
| Sample 31-5 |  | 5 |  |  |  | 2.35 | NO | 99 | NO |
| Sample 31-6 |  | 6 |  |  |  | 1.70 | YES | 97 | NO |
| Sample 31-7 |  | 7 |  |  |  | 0.95 | YES | 97 | NO |
| Sample 32-1 | prism | 1 | 0.03 | 300 | 1.7 | 4.79 | NO | 53 | NO |
| Sample 32-2 |  | 2 |  |  |  | 2.34 | NO | 100 | NO |
| Sample 32-3 |  | 3 |  |  |  | 2.28 | NO | 101 | NO |
| Sample 32-4 |  | 4 |  |  |  | 2.14 | NO | 103 | NO |
| Sample 32-5 |  | 5 |  |  |  | 1.57 | YES | 102 | NO |
| Sample 32-6 |  | 6 |  |  |  | 1.14 | YES | 100 | NO |
| Sample 32-7 |  | 7 |  |  |  | 0.64 | YES | 100 | NO |

As shown in Table 6, for the case where the liquid crystal display panel has a pixel pitch of 510 μm, no moire was observed for the liquid crystal display devices using, as the light-condensing sheet, the prism sheets having pitches of arrangement P of the irregularities of 30 μm, 50 μm, 85 μm and 110 μm.

For the case where the irregularities have a pitch of arrangement P of 160 μm, the moire was observed in sample (30-7) using the "diffuser sheet 7". For the case where the pitch of arrangement P is 200 μm, the moire was observed in samples (31-6, 31-7) using the "diffuser sheets 6, 7". For the case where the pitch of arrangement P is 300 μm, the moire was observed in samples (32-5 to 32-7) using the "diffuser sheets 5, 6, 7".

It is known from Table 6 that, in the liquid crystal display device having a liquid crystal display panel having a pixel pitch of 510 μm, the moire is more likely to occur as the pitch of arrangement of the irregularities of the light-condensing sheet becomes larger, in which a combination of the diffuser sheet and the light-condensing sheet capable of adjusting the value of "(H/Tt)·(Pp/P)" to 1.7 or larger may successfully suppress the moire generation.

On the other hand, it is understood that better front luminance characteristics may be obtained as values of the pitch of arrangement P of the irregularities become larger. This is supposedly because widening of the pitch of arrangement P expands the regions of irregular surfaces, thereby the condensing characteristics (or lens characteristics) may be improved, the light-condensing characteristics may be improved, and the front luminance may be improved. However, sample 26 having a value of Pw/P exceeding 0.2 showed decrease in the front luminance by 10% or more from the reference value, and failed in suppressing decrease in the luminance.

No deflection was found to occur in the process of mounting. This is supposedly because bonding of the light-condensing sheet and the diffuser sheet improves the rigidity as compared with the case where the individual sheets are used independently, so that deformation due to heat from the backlight may become less likely to occur.

Example 6

Next, a reflection-type polarizer "DBEFD" with a diffuser function shown in Table 2 was used as the diffuser sheet, and was combined with each of the light-condensing sheets and a liquid crystal display panel to thereby configure each liquid crystal display device. The light-condensing sheets used herein were the prism sheet and the hyperboloid lenticular lens sheets having the individual pitches of arrangement used in Example 1. The liquid crystal display panel used herein was those having pixel pitches of 320 μm and 510 μm. Measurement of "(H/Tt)·(Pp/P)", evaluation of moire generation, measurement of front luminance, and evaluation of deflection after mounting were carried out for each of thus-configured liquid crystal display devices, similarly to as described in Example 2. Results are shown in Table 7.

TABLE 7

|  |  | Geometry of Irregularity | Diffusion Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| 320 | Sample 33-1 | prism | DBEFD | 0.33 | 30 | 10.67 | 18.56 | NO | 88 | NO |
|  | Sample 33-2 |  |  | 0.2 | 50 | 6.40 | 11.14 | NO | 92 | NO |
|  | Sample 33-3 |  |  | 0.12 | 85 | 3.76 | 6.55 | NO | 96 | NO |
|  | Sample 33-4 |  |  | 0.09 | 110 | 2.91 | 5.06 | NO | 98 | NO |
|  | Sample 33-5 |  |  | 0.063 | 160 | 2.00 | 3.48 | NO | 100 | NO |
|  | Sample 33-6 |  |  | 0.05 | 200 | 1.60 | 2.78 | NO | 99 | NO |
|  | Sample 33-7 |  |  | 0.03 | 300 | 1.07 | 1.86 | NO | 100 | NO |
|  | Sample 33-8 |  |  | 0 | 50 | 6.40 | 11.14 | NO | 101 | SOME |
| 510 | Sample 34-1 | prism | DBEFD | 0.33 | 30 | 17.00 | 29.58 | NO | 81 | NO |
|  | Sample 34-2 |  |  | 0.2 | 50 | 10.20 | 17.75 | NO | 89 | NO |
|  | Sample 34-3 |  |  | 0.12 | 85 | 6.00 | 10.44 | NO | 94 | NO |
|  | Sample 34-4 |  |  | 0.09 | 110 | 4.64 | 8.07 | NO | 95 | NO |
|  | Sample 34-5 |  |  | 0.063 | 160 | 3.19 | 5.55 | NO | 97 | NO |
|  | Sample 34-6 |  |  | 0.05 | 200 | 2.55 | 4.44 | NO | 98 | NO |
|  | Sample 34-7 |  |  | 0.03 | 300 | 1.70 | 2.96 | NO | 98 | NO |
|  | Sample 34-8 |  |  | 0 | 50 | 10.20 | 17.75 | NO | 90 | YES |
| 320 | Sample 35-1 | hyperboloid | DBEFD | 0.56 | 30 | 10.67 | 18.56 | NO | 80 | NO |
|  | Sample 35-2 |  |  | 0.34 | 50 | 6.40 | 11.14 | NO | 90 | NO |

TABLE 7-continued

| | Sample | Geometry of Irregularity | Diffusion Sheet Type | Pw/P (—) | P (μm) | Pp/P (—) | (H/T) * (Pp/P) | Moire | Front Luminance Value (%) | Deflection |
|---|---|---|---|---|---|---|---|---|---|---|
| | Sample 35-3 | | | 0.2 | 85 | 3.76 | 6.55 | NO | 96 | NO |
| | Sample 35-4 | | | 0.155 | 110 | 2.91 | 5.06 | NO | 98 | NO |
| | Sample 35-5 | | | 0.106 | 160 | 2.00 | 3.48 | NO | 100 | NO |
| | Sample 35-6 | | | 0.085 | 200 | 1.60 | 2.78 | NO | 101 | NO |
| | Sample 35-7 | | | 0.057 | 300 | 1.07 | 1.86 | NO | 101 | NO |
| | Sample 35-8 | | | 0 | 50 | 6.40 | 11.14 | NO | 90 | SOME |
| 510 | Sample 36-1 | hyperboloid | DBEFD | 0.56 | 30 | 17.00 | 29.58 | NO | 75 | NO |
| | Sample 36-2 | | | 0.34 | 50 | 10.20 | 17.75 | NO | 84 | NO |
| | Sample 36-3 | | | 0.2 | 85 | 6.00 | 10.44 | NO | 90 | NO |
| | Sample 36-4 | | | 0.155 | 110 | 4.64 | 8.07 | NO | 95 | NO |
| | Sample 36-5 | | | 0.106 | 160 | 3.19 | 5.55 | NO | 98 | NO |
| | Sample 36-6 | | | 0.085 | 200 | 2.55 | 4.44 | NO | 99 | NO |
| | Sample 36-7 | | | 0.057 | 300 | 1.70 | 2.96 | NO | 100 | NO |
| | Sample 36-8 | | | 0 | 50 | 10.2 | 17.75 | NO | 86 | YES |

Measurement values of front luminance were expressed as relative values with respect to the measurement value of front luminance of a prism sheet "Thick BEFIII" available from 3M.

As shown in Table 7, the front luminance may largely be improved by using, as the diffuser sheet, the reflection-type polarized-light separation element with the diffuser function. However, samples having values of Pw/P exceeding 0.2 (33-1, 34-1, 35-1, 35-2, 36-1, 36-2) showed decrease in the front luminance by 10% to 20% or more from the reference value, and failed in suppressing decrease in the luminance.

Although deflection was observed when the light-condensing sheet was used alone (samples 33-8, 34-8), but bonding of the light-condensing sheet with the reflection-type polarized-light separation element raised the rigidity and improved the deflection. Difference in evaluation of deflection between samples 33-8 and 34-8 may be ascribable to difference in the sheet size (screen size).

Although the embodiments and Examples of the present invention have been described in the above, the present is by no means limited thereto, allowing various modifications on the basis of the technical spirit of the present invention.

For example, in the embodiments described in the above, the geometry and the pitch of arrangement P of the irregularities 14P, 14L on the light-condensing sheet 14 were set uniform over the entire region of the light-condensing sheet 14, whereas the prism component 14P or the lens component 14L may be formed as having different geometries or pitches of arrangement, depending on regions. By modifying the geometry and the pitch of arrangement in a regular or irregular manner may enhance the effect of suppressing moire. Maximum value of the pitch of arrangement P is preferably determined in accordance with the equation described above.

Figure 11A:
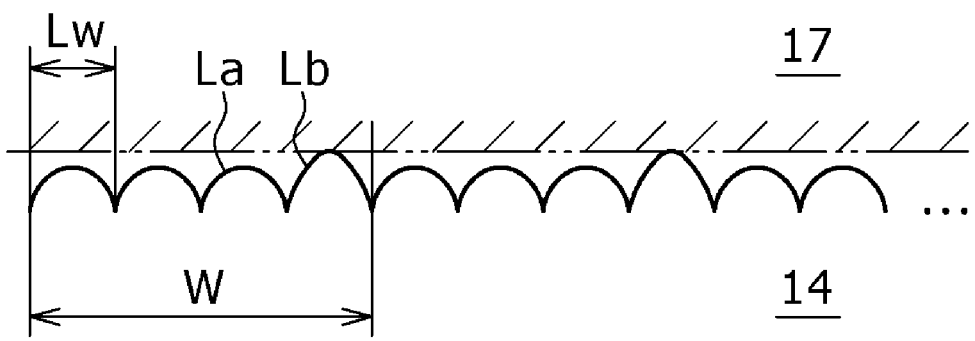
FIGS. 11A and 11B are drawings explaining a modified example of configuration of the light-condensing sheet.

FIG. 11A shows an exemplary light-condensing sheet 14 having two types of irregularities La, Lb differed in the sectional geometry arranged in a periodical or non-periodical manner. In this case, the moire may effectively be suppressed by adjusting the width of formation W of the lines of the periodically-configured irregularities twice to 100 times, and preferably twice to 20 times, as large as the width Lw of the individual irregularities La, Lb. On the other hand, for an exemplary case where the light-condensing sheet 14 is formed as having two types of irregularities La, Lb differed in the sectional geometry randomly arranged thereon as shown in FIG. 1B, the sheet is preferably configured so as to avoid 10 lines of consecution, and preferably 5 lines of consecution, of equally-configured lens elements.

Figure 11B:
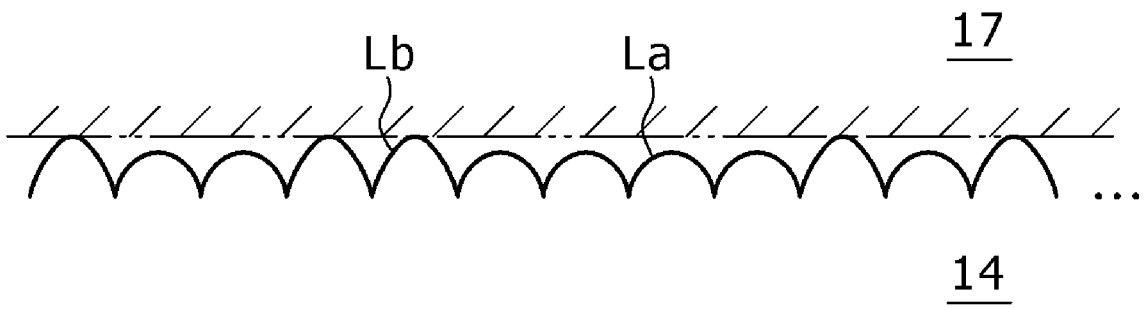

It may be also allowable as shown in FIGS. 11A and 11B that regions of bonding are limited to the apexes of either ones of irregularities, Lb, due to difference in the geometries thereof. Also in this case, the width of bonding Pw of the apexes of the irregularities Lb to the adhesive layer (not shown) of the diffuser sheet 17 is designed so as to satisfy the equation (3) in the above. The width of formation of the irregularities Lb will preferably be applicable to the pitch of arrangement P herein is preferably. The same will apply also to the case where the irregularities are composed of the prism components.

Figure 12:
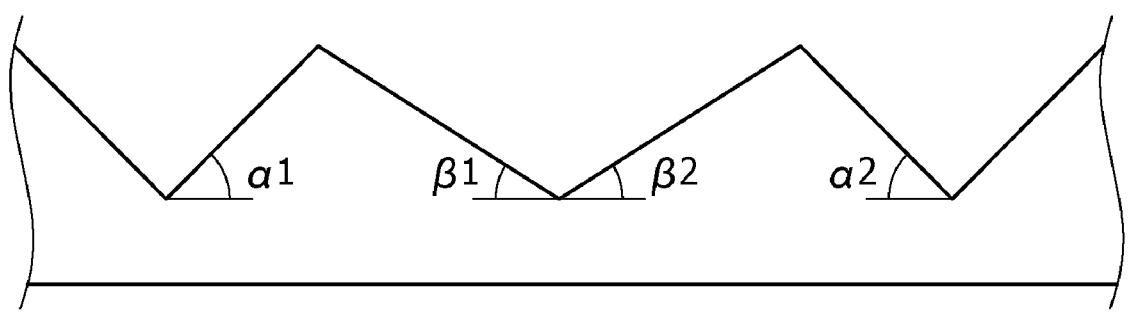
FIG. 12 is a drawing explaining a modified example of configuration adopting a prism sheet as the light-condensing sheet.

For an exemplary case where the light-condensing sheet 14 is composed of the prism sheet, the slopes of the prism components may have different angles of inclination typically as shown in FIG. 12. By composing the prism sheet using a plurality of prism components differed from each other in the base angles α(α1, α2) and β(β1, β2), the angle of viewing may be widened while suppressing lowering in the front luminance. Combination of the base angle α and the base angle β in this case is not specifically limited, and may appropriately be set within the range of typically from 45° to 60°. The apex may be determined depending on the degree of base angles α, β. It is also allowable to make the base angles α, β of the adjacent prism components differed from each other (α1≠α2, β1≠β2).

Figure 13:
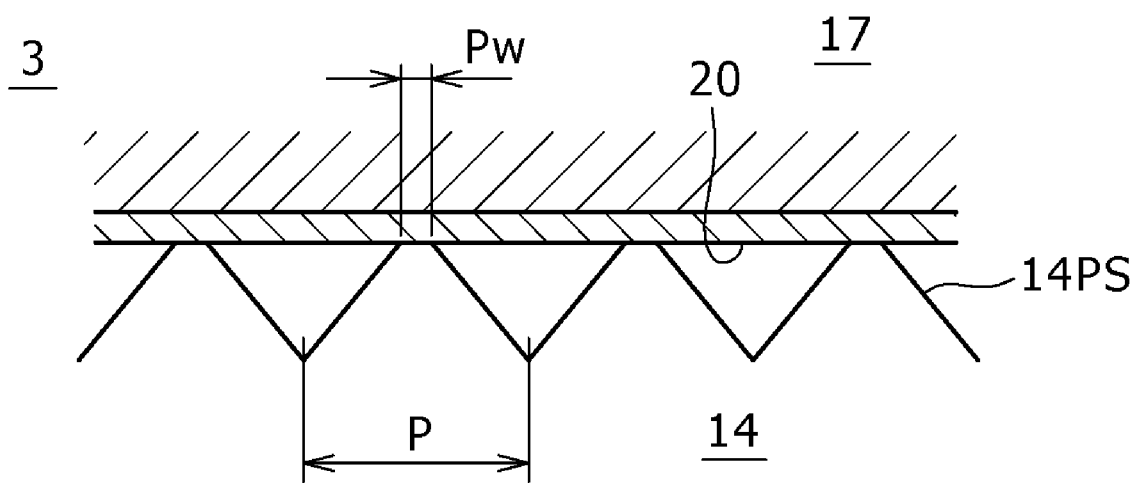
FIG. 13 is a drawing explaining another modified example of configuration adopting a prism sheet as the light-condensing sheet.

Geometries of the irregularities are not limited to those of the prism components, but may be those of quasi-prism components 14PS having each apex composed of a flat surface typically as shown in FIG. 13. In this case, the width of bonding Pw of the apexes of the irregularities to the adhesive layer 20 may be the width of formation of each flat surface at the apex of each quasi-prism component 14PS, and thereby uniformity in the width of bonding Pw of the individual lines of the prism component may be improved.

The adhesive layer 20 is not necessarily formed over the entire surface of the surface-of-incidence of the diffuser sheet 17. For example, the adhesive layer is formed on the apexes of the irregularities 14P, 14S, 14PS of the light-condensing sheet 14, and while placing the adhesive layer in between, the light-condensing sheet 14 may be bonded to the diffuser sheet 17. The adhesive layer in this case may not necessarily be formed continuously on the ridgelines of the irregularities, but may be formed, for example, in a discrete manner along the ridgelines of the irregularities.

As has been described in the above, according to the present invention, the sheets may be prevented from deflecting, consumption of the side-components may be reduced, and the thermal deformation may be avoidable, while minimizing lowering in the front luminance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet stack comprising a first optical sheet having a large number of irregularities consecutively arranged on one surface thereof, and a second optical sheet stacked thereon, wherein:
   the second optical sheet has, on a bonding surface thereof, an adhesive layer bonded with apexes of the irregularities, and
   while assuming pitch of arrangement of the irregularities as P, and width of bonding of each apex of the irregularities bonded to the adhesive layer as Pw, the relation:

$0 < Pw/P \leq 0.2$ is satisfied.

2. The optical sheet stack as claimed in claim 1, wherein the pitch of arrangement P of the irregularities is 110 μm or larger.

3. The optical sheet stack as claimed in claim 1, wherein the irregularities are composed of prism components having a triangular section.

4. The optical sheet stack as claimed in claim 1, wherein:
   the irregularities are composed of lens components having hyperboloids or paraboloids, and
   while assuming the Z-axis in parallel with the direction of normal line on the first optical sheet, and assuming the X-axis in the direction of arrangement of the lens components, a sectional geometry of each lens component satisfies the relation below:

$Z = X^2/(R + \sqrt{(R^2 - (1+K)X^2)})$ where, R is radius of curvature [μm] of the apex, and K is Conic constant.

5. The optical sheet stack as claimed in claim 1, wherein:
   the irregularities are composed of lens components having aspherical surfaces of a high order, and
   while assuming the Z-axis in parallel with the direction of normal line on the first optical sheet, and assuming the X-axis in the direction of arrangement of the lens components, the sectional geometry of each lens component satisfies the relation below:

$Z = X^2/(R + \sqrt{(R^2 - (1+K)X^2)}) + AX^4 + BX^5 + CX^6 + \ldots$ where, R is radius of curvature [μm] of the apex, K is Conic constant, and A, B, C, ... are aspherical coefficients.

6. The optical sheet stack as claimed in claim 1, wherein the second optical sheet is a diffuser sheet having at least a diffusion function.

7. The optical sheet stack as claimed in claim 1, wherein the second optical sheet is a reflection-type polarized-light separation element allowing a first linearly polarized light to transmit therethrough, and reflecting thereon a second linearly polarized light.

8. The optical sheet stack as claimed in claim 1, wherein:
   the second optical sheet is a diffuser sheet,
   the optical sheet stack is used in combination with a liquid crystal display panel, and
   while assuming pitch of arrangement of the irregularities as P [μm], haze value of the diffuser sheet as H [%], total transmissivity of light of the diffuser sheet as Tt [%], and pixel pitch of the liquid crystal display panel as Pp [μm], the relation:

$(H/Tt) \cdot (Pp/P) \geq 1.7$ is satisfied.

9. The optical sheet stack as claimed in claim 1, wherein outside geometry of the irregularities varies in a random manner or in a periodical manner.

10. The optical sheet stack as claimed in claim 1, wherein:
    the irregularities are composed of prism components having a triangular section, and
    slopes of each prism component are formed at different angles of inclination.

11. A liquid crystal display device comprising a liquid crystal display panel, a light source disposed on a back side of the liquid crystal display panel, and an optical sheet stack disposed between the liquid crystal display panel and the light source, the optical sheet stack being composed of a first optical sheet having a large number of irregularities consecutively arranged on one surface thereof and a second optical sheet stacked thereon, and wherein:
    the second optical sheet has, on a bonding surface thereof, an adhesive layer bonded with apexes of the irregularities, and
    while assuming pitch of arrangement of the irregularities as P, and width of bonding of the apexes of the irregularities bonded to the adhesive layer as Pw, the relation:

$0 < Pw/P \leq 0.2$ is satisfied.

12. The liquid crystal display device as claimed in claim 11, wherein:
    the second optical sheet is a diffuser sheet, and
    while assuming pitch of arrangement of the irregularities as P [μm], haze value of the diffuser sheet as H [%], total transmissivity of light of the diffuser sheet as Tt [%], and pixel pitch of the liquid crystal display panel as Pp [μm], the relation:

$(H/Tt) \cdot (Pp/P) \geq 1.7$ is satisfied.

* * * * *